United States Patent
Schaible, II et al.

(10) Patent No.: US 6,365,210 B1
(45) Date of Patent: Apr. 2, 2002

(54) PIZZA CRUST AND PROCESS AND APPARATUS FOR MAKING SAME

(75) Inventors: John E. Schaible, II, Easton, PA (US); Jeffrey R. Pakulski, Erie, MI (US)

(73) Assignee: M & M Holdings, Inc., Detroit, MI (US)

(*) Notice: Subject to any disclaimer, the term of this patent is extended or adjusted under 35 U.S.C. 154(b) by 0 days.

(21) Appl. No.: 09/391,948

(22) Filed: Sep. 8, 1999

Related U.S. Application Data

(60) Provisional application No. 60/099,796, filed on Sep. 10, 1998.

(51) Int. Cl.$^7$ ............................................. A21D 13/00
(52) U.S. Cl. .................... 426/94; 426/275; 426/283; 426/496; 426/506; 426/523; 426/549; 99/484
(58) Field of Search .......................... 426/94, 275, 283, 426/549, 496, 506, 523; 99/484

(56) References Cited

U.S. PATENT DOCUMENTS

| | | |
|---|---|---|
| 87,390 A | 3/1869 | Betts |
| 666,216 A | 1/1901 | Zeininger |
| 1,076,464 A | 10/1913 | Stiriz |
| 1,169,023 A | 1/1916 | Embrey |
| 1,224,492 A | 5/1917 | Narobe |
| 2,154,449 A | 4/1939 | Hoffman et al. |
| 2,204,045 A | 6/1940 | Meacham |
| 2,357,679 A | 9/1944 | Moench, Jr. |
| 2,549,595 A | 4/1951 | Gregor |
| 2,668,117 A | 2/1954 | Bucci |
| 2,767,667 A | 10/1956 | Spooner |
| 2,774,316 A | 12/1956 | Daino |
| 2,855,893 A | 10/1958 | Greer et al. |
| 2,953,107 A | 9/1960 | Marasso |
| 2,969,289 A | 1/1961 | Matz et al. |
| 3,007,800 A | 11/1961 | Kimbrough et al. |
| 3,161,523 A | 12/1964 | Ort |
| 3,170,795 A | 2/1965 | Andre |
| 3,275,450 A | 9/1966 | Holstein |
| 3,275,451 A | 9/1966 | Holstein |
| 3,347,181 A | 10/1967 | Pizzo |
| 3,368,503 A | 2/1968 | Gaylord |
| 3,379,141 A | 4/1968 | Groth |
| 3,565,015 A | 2/1971 | Jorgensen |
| 3,574,634 A | 4/1971 | Singer |
| 3,615,678 A | 10/1971 | Tangel et al. |
| 3,615,679 A | 10/1971 | Tangel |
| 3,777,703 A | 12/1973 | Van Patten et al. |
| 3,803,326 A | 4/1974 | Craig et al. |
| 3,814,005 A | 6/1974 | Widdel |
| 3,845,219 A | 10/1974 | Federico |
| 3,879,564 A | 4/1975 | Cocozzella |
| 3,897,568 A | 7/1975 | Johnson |
| 3,934,040 A | 1/1976 | Smerak et al. |
| 3,958,032 A | 5/1976 | Merriam |
| 3,968,268 A | 7/1976 | Sair et al. |
| 3,979,525 A | 9/1976 | Plemons et al. |
| 3,982,481 A | 9/1976 | Console et al. |
| 4,020,184 A | 4/1977 | Chesner |
| 4,054,679 A | 10/1977 | Melcer et al. |
| 4,109,018 A | 8/1978 | Thompson |
| 4,251,549 A | 2/1981 | Fournet et al. |
| 4,271,200 A | 6/1981 | Hempenius et al. |
| 4,283,424 A | 8/1981 | Manoski et al. |
| 4,303,677 A | 12/1981 | De Acetis |
| 4,395,426 A | 7/1983 | Fan |
| 4,404,227 A | 9/1983 | Pomper et al. |
| 4,405,648 A | 9/1983 | Atsumi et al. |
| 4,481,222 A | 11/1984 | Fan |
| 4,556,572 A | 12/1985 | Kaufman, Jr. et al. |
| 4,645,673 A | 2/1987 | Wilmes |
| 4,741,916 A | 5/1988 | Heidel et al. |
| 4,788,067 A | 11/1988 | Seneau |
| 4,842,882 A | 6/1989 | Paulucci |
| 4,847,104 A | 7/1989 | Benjamin et al. |
| 4,861,601 A | 8/1989 | Seneau |
| 4,862,794 A | 9/1989 | Lapeyre et al. |
| 4,966,778 A | 10/1990 | Benjamin et al. |
| 4,992,285 A | 2/1991 | Larsen |
| 5,072,663 A | 12/1991 | Ellis-Brown |
| 5,075,120 A | 12/1991 | Leary et al. |
| 5,094,859 A | 3/1992 | Sluimer |
| 5,171,590 A | 12/1992 | Sluimer |
| 5,184,538 A | 2/1993 | Ledet |
| 5,188,855 A | 2/1993 | Bernacchi et al. |
| 5,192,567 A | 3/1993 | Vickers et al. |
| 5,260,078 A | 11/1993 | Spicer |

(List continued on next page.)

FOREIGN PATENT DOCUMENTS

| | | |
|---|---|---|
| DE | 2446581 | 9/1974 |
| FR | 2285834 | 5/1976 |
| GB | 1468997 | 3/1977 |

OTHER PUBLICATIONS

The Freezing Preservation of Foods, vol. 1—Principles of Refrigeration– Equipement for Food Freezing—Refrigerating and Transporting Frozen Foods by Donald K. Tresssler, No date.

Primary Examiner—Lien Tran
(74) Attorney, Agent, or Firm—Reising, Ethington, Barnes, Kisselle, Learman & McCulloch, P.C.

(57) ABSTRACT

A method of preparing parbaked food products, such as pizza crust shells, apparatus and dough formulation used therein, and the product produced by the process. The process comprises the steps of providing a dough including flour, sugar and water, and preferably also a leavening agent such as instant yeast. The dough is rounded, first proofed, panned, pressed and second proofed. The prepared dough piece is then steam hydrated under conditions sufficient to cause moisture absorption and a resultant increase in moisture content throughout the dough. Then the hydrated dough piece is immediately sequentially parbaked until gelatinization of the starch is complete. At least one parbaking condition is adjusted selected from the group consisting of initial dough temperature, oven temperature, parbaking time, dough absorption and dough thickness and coordinated with the moisture content condition of the dough upon completion of the steam hydration for thereby delaying external browning of the dough.

29 Claims, 8 Drawing Sheets

U.S. PATENT DOCUMENTS

| | | |
|---|---|---|
| 5,262,182 A | 11/1993 | Kasahara et al. |
| 5,281,433 A | 1/1994 | Gantwerker et al. |
| 5,354,566 A | 10/1994 | Addesso et al. |
| 5,417,989 A | 5/1995 | Atwood et al. |
| 5,441,751 A | 8/1995 | Vagani |
| 5,447,738 A | 9/1995 | De Bruijne et al. |
| 5,451,417 A | 9/1995 | Freyn et al. |
| 5,527,549 A | 6/1996 | Bernacchi et al. |
| 5,620,731 A | 4/1997 | McKee |
| 5,960,703 A | 10/1999 | Jara et al. |
| 6,001,400 A * | 12/1999 | Burger ......................... 426/94 |
| 6,113,956 A * | 9/2000 | Bower ......................... 426/94 |

* cited by examiner

PIZZA CRUST AND PROCESS AND APPARATUS FOR MAKING SAME

This is a United States regular utility patent application filed pursuant to 35 U.S.C. § 111 (a) and claiming the benefit under the provisions of 35 U.S.C. § 119 (e) (1) of the priority of U.S. provisional patent application Ser. No. 60/099,796 filed Sep. 10, 1998 pursuant to 35 U.S.C. § 111 (b).

FIELD OF THE INVENTION

This invention relates to the field of bakery products and methods and apparatus for baking such products, and more particularly to new and improved parbaked pizza crust and improved apparatus and process for making same.

BACKGROUND OF THE INVENTION

This invention primarily relates to the manufacture of pizza, a well-known type of leavened pastry usually consisting of a sheet of dough, baked with a covering of tomato sauce, cheese, seasoning and oil. As it is a relatively thin, flat sheet of dough in which the yeast has already worked, only a few minutes are required for the baking, and it is usually served hot. Nevertheless, this simple popular dish presents certain difficulties in any pizza carry-out store and in food service establishments such as restaurants where a considerable number of patrons all want their pizza at substantially the same time. As ordinarily made, it requires a specially trained baking cook with certain manual dexterity, who is rushed for awhile and then may have little or nothing to do for long periods of the day. When made in the traditional way, the dough can be mixed and proofed in advance, with the risen dough kept in a cooler; but it is not practical to form, fill and bake in advance, since the filling would lose its freshness. The filling also affects the baking of the center of the dough as distinguished from the rim. Under such conditions, small restaurants cannot afford a pizza cook.

The prior art solves the problem to some extent by making possible the advance partial cooking, by various par-baking processes, of the sheets of dough pressed and/or molded in their traditional form, including a naturally risen rim, so that the dish can be mostly prepared in advance and handled during the rush as a brown-and-serve item. This also makes possible the packaging and sale of pizzas for home cooking as a brown-and-serve item so that the average housewife can cook and serve it as a family dish. The formed dough is rather tough, particularly before the final browning, so that it will stand handling and shipment, while the ingredients for the filling can be included in sealed plastic bags. The housewife has merely to spread them on the pastry, heat to brown the dough, and serve. The process is even quicker in a restaurant, where the raw filling is available in quantity.

Although pizza is also a popular item in restaurants and pizzerias, these places most often also lack the facilities and/or labor for making the pizza crusts because they must be rolled out and prebaked before application of sauce and topping materials. For this reason, pizza crusts are often purchased from large manufacturers of crusts, partially baked, and the restaurants and pizzerias subsequently apply sauce and topping filling materials, and then bake the filled crust shortly before serving to the customer.

The crust manufacturers make partially baked (parbaked) pizza crusts in large volume, and then ship them to distributors, often over considerable distances, even by transcontinental shipping. The distributors then deliver the crusts to the restaurants and pizzerias. The partially baked pizza crusts are stored under refrigeration, both during shipping and in the restaurant prior to use, where the amount of refrigerated storage space is often severely limited.

Thus, over the years the tomato pie, or as it is more commonly known, the pizza pie or simply pizza, has become a truly national food. The popularity of the pizza today has so accelerated that it probably enjoys a pre-eminence equal to that of the hotdog or to that of popcorn. In keeping with the ever increasing demand for pizza, the food industry has converted what was traditionally a food requiring many hours of preparation into a fast food product. This has resulted in placing a variety of pizza products on the market, each of which, although for the most part a frozen food, invariably claims to provide an authentic pizza which is the equivalent of any pizza made-to-order, that is to say, a pizza which is made from freshly made dough.

In order to take advantage of this growing market, a number of companies have produced frozen pizzas for marketing to supermarkets and grocery stores. Some companies further market their frozen pizzas to fast food chains, as well as restaurants. These uncooked frozen pizza products, however, have not been found to be satisfactory. Upon cooking, such frozen pizzas have not displayed the spongy texture and freshness achieved with fresh cooked pizza. In addition, storage stability with many of these products is a problem and, therefore, such products can only be kept fresh by including large amounts of preservatives. However, as consumers become more health conscious, they become less accepting of products which employ such preservatives. Thus, the search for frozen products which display the taste and texture of fresh pizza, and can be stored without quantities of preservatives, has continued.

It has long been appreciated by those individuals skilled in the culinary art of frozen pizza making, that all of the ingredients which combine to make a pizza, the dough is by far the most important. Ideally the dough should retain a structure and texture as closely characteristic to freshly baked dough as possible, even though the pizza is purchased in a frozen state. In this way the consumer is assured of purchasing a product which closely matches a made-to-order pizza.

Much research and development effort has therefore been expended in the last several decades in efforts to make economically available a method which when practiced will yield a pizza which compares satisfactorily to a made-to-order pizza. None of the attempts in this area of which we are aware can actually claim to have succeeded in their efforts in this regard, i.e., none of these will yield a pizza which satisfactorily compares to a made-to-order pizza and that can be economically manufactured on a mass production basis in an automated facility.

One of the popular processes for providing factory premade pizzas has been the aforementioned manufacture by crust makers of partially baked pizza crusts in large volume using the developments in the par-baking arts that initiated with Gregor U.S. Pat. No. 2,549,595, the 1951 pioneer par-baking patent, which is incorporated herein by reference. The par-bake process in the Gregor patent was developed for making what became known as "Brown and Serve" French bread. This type of food product has become very popular in terms of providing in supermarkets and to the food service industry semi-baked dinner rolls and various sweet rolls that have become popular retail food items. These semi-baked goods, when browned at relatively high oven temperatures in the home, or in restaurants or other food service facilities, are of excellent quality and flavor and have found wide acceptance by housewives and food service customers due not only to their palatability but also to the ease of which they were prepared in the restaurant or other food service facility, as well as in the home.

In conventional brown and serve practice, any standard dough for baked goods is divided into the desired size and semi/baked at a bakery under controlled conditions of temperature and baking time so as to substantially fully cook the dough while avoiding the formation of a crust on the outer surface and avoiding browning of the outer surface. More particularly, the baking conditions are adjusted so as to substantially complete gelatinization of the starch and liberation of carbon dioxide by yeast action and to then arrest the yeast action. The semi-baked product then has sufficient rigidity to withstand removal from the oven and subsequent handling and packaging without collapsing. In addition, the semi-baked product has a relatively high moisture content if compared to a fully baked product. The consumer prepares the product for eating by a final baking step during which the desired crust and browning of the same is obtained and during which the moisture content is reduced to that of a freshly-baked item.

It is apparent that the crusting and browning action during the final baking step for the abovementioned rolls and hearth bread occurs only on exterior surfaces of the article. The inside of the article remains relatively unaffected, it being merely heated and having its moisture content reduced to substantially that of a freshly-baked article. The result is a roll or loaf of hearth bread which to the senses of sight and taste has been freshly-baked and which is substantially indistinguishable from the same article if prepared by a conventional one step baking process.

The development of par-baked products of the aforementioned character has thus recognized the importance of the moisture content of the finished par-baked product prior to use in the final baking step, whether such be in the home, restaurant or food service establishment. The addition of moisture in various forms and in various ways with a variety of apparatus has long been known and many various efforts proposed in the prior art. The same is true in the older general baking art. For example, injecting steam into a baking oven goes back to the immediate post Civil War period with the 1869 to Betts U.S. Pat. No. 87,390. Other examples of prior art patents employing or injecting steam into a baking oven include: Zeininger U.S. Pat. No. 666,216 (1901): Embrey U.S. Pat. No. 1,169,023 (1916): Meacham U.S. Pat. No. 2,204,045 (1940): Spooner U.S. Pat. 2,767,667 (1956): British Saario U.S. Pat. No. 1,468,997 (1977): Chesner U.S. Pat. No. 4,030,184 (1977): Seneau U.S. Pat. No. 4,788,067 (1988): Seneau U.S. Pat. No. 4,861,601 (1989) and Sluimer U.S. Pat. No. 5, 171,590 (1992).

Indeed, today various makes of commercial baking ovens of conveyor and convection type designed for commercial baking processes often include the facility for steam injection into the oven compartment. One major problem, however, with injecting steam into the baking oven is, of course, its inefficiency since it may be counteractive to the baking process. Also due to phase changes thereby introduced involving latent heat of evaporation and/or latent heat of condensation, introducing steam into the oven makes it much more difficult to accurately and reliably control the interior baking environment of the oven, particularly in an automated mass production facility.

It has also been proposed in the prior art to introduce steam into the conventional baking process both within the confines of an oven compartment but generally upstream of the baking area, as set forth in the above listed Spooner U.S. Pat. No. 2,767,667. In the Spooner process of FIG. 1 and in the alternative of FIG. 1A, the steam is introduced from a manifold hood disposed above a dough being conveyed on an open conveyor in an area that is unconfined laterally, but wherein steam is injected downwardly and then recaptured upwardly by suction by drafting back upwardly into the steaming apparatus allegedly for recycling.

As set forth in the Spooner patent, the purpose of steaming as proposed in the Spooner apparatus and process, is set forth in column 1, lines 23–29 as follows:

"The steaming of certain food products, for example dough in the baking of bread is desirable in order to break down the starch cells of the surface of the goods whereby to produce a smooth and shiny surface on the baked product and to keep the skin of the product plastic while expansion is taking place."

Thus, in the Spooner process and apparatus as disclosed in the '667 patent, the purpose and effect of the steam is to "lightly kiss" the exposed upper surface of the bread dough as it enters the baking oven chamber on the transport conveyor provided for the same. Spooner is thus not concerned with the ultimate moisture content of the product as baked, much less as par-baked.

The recently issued McKee U.S. Pat. No. 5,620,731 is illustrative of the current state of the art and problems that still remain in attempting to make successfully a par-baked pizza crust. The McKee '731 patent is directed to a method of par-baking a foodstuff, particularly pizza crust, and more particularly to par-baking such a foodstuff so that the completely baked foodstuff is allegedly virtually indistinguishable from such a foodstuff when baked with topping thereon from the raw state in a single step. The background information and teaching of the McKee '731 patent is instructive since it sets forth many of the current problems and thus may assist in better understanding the principles, steps and procedures of the present invention to be described in more detail hereinafter.

As pointed out in McKee '731, raw dough is, by definition, elastic. If raw pizza dough is placed directly on a perforated pizza cooking surface (such as a chain conveyor oven), the weight of the pizza plus any pressure from above (e.g., due to hot air impingement on the upper surface of the pizza) causes the dough to collapse and to be pulled into the perforations. As a result, when raw pizza dough is cooked in an oven with moving air, it is typically held in or on some type of pan, container, platter or other cooking vessel during the cooking process. This is the way most pizzas are cooked in traditional conveyor ovens. The pizza in a pan is placed on a conveyor at one end of the oven and when it comes out the other end of the oven, the pizza is removed from the pan. The pan is not a problem in this environment; it is standard practice.

As further pointed out in McKee '731, a traditional object in cooking is to cook quality food fast. The introduction of an additional surface (e.g., a pan) between the raw dough pizza and heat transfer means on the underside of the raw dough pizza, although enabling the pizza to be cooked and removed from a supporting surface, results in a slower cook than if the additional surface were not there. If the dough has been "pre-set": sometimes referred to as "par-baked," "pre-baked" or "partially baked"—the pizza can be placed directly on the perforated cooking surface (without an intermediary pan) and, as a result, cook faster. This is because a par-baked pizza dough has had its dough structure set: elasticity is gone due to setting of the dough's cell structure, and the dough has the strength to undergo the cooking process without changing shape. Using par-baked dough also speeds up the cooking process because not as much cooking is required to complete the cooking; the dough has already been partially cooked (i.e., par-baked) and merely needs to be browned and crisped during the final step of the cooking process. In fact, par-baked crusts are used frequently within the pizza restaurant industry because, when cooking speed is desired, they may allow a reduction of from 8–8.5 minutes to 5 minutes or less in the final step cook time of a 12" diameter pizza (i.e., a reduction of about 20–30% of the total one-step time).

However, McKee '731 further points out that it is generally accepted that par-baked doughs are of lower quality than doughs that are "cooked from raw." After two step cooking, the par-baked doughs are typically tougher, drier, crustier (even in the central portion of a pizza) and frequently overcooked on the top and/or undercooked on the bottom.

On the other hand, there exists a strong impetus not to bake dough from the raw state. Baking the doughs from the raw state causes problems in practice which include the following:

1. It is extremely time consuming to prepare the dough. The dough retains its freshness for a very short period of time, typically a few hours, typically with a maximum of eight to twenty hours depending on the type of dough. As a result, dough preparation typically is done both in the morning in anticipation of the lunch business and in the afternoon in anticipation of the dinner business. A typical pizza dough-making procedure in a pizza restaurant often starts three or four hours before opening of the restaurant to the public. For example, the early arriving employees may be required to mix the dough, portion it, roll it, place it in a pan (with or without oil on the bottom), proof it (let is rise) and refrigerate it until it is time to cook it.
2. As the quality of the workforce fluctuates, and labor costs increase, there is increasing demand to remove the dough preparation phase from the pizza restaurants and have it done on a batch basis outside the restaurants in a central location.
3. Once prepared, raw dough deteriorates rapidly relative to par-baked dough, even when refrigerated, thus leading to waste when too large a quantity of raw dough has been initially prepared.
4. Typically pizza cooking ovens have only one setting at any particular time, and this causes problems when doughs of different thicknesses are cooked side by side because thinner doughs cook faster than thicker doughs.

The McKee '731 patent further asserts that it has been found that the disadvantages of par-baked doughs arise as follows:

1. When a pizza dough is cooked by itself (i.e., par-baked without topping on the top thereof), more heat is driven into the top of the dough than would be the case if the dough were cooked without topping applied. This is because the topping acts as a thermal insulator for the raw dough as heat is driven into the top of the pizza. When this thermal insulator (i.e., the topping) is not present, more heat is driven into the top of the dough. This results in a tougher dough product.
2. When a pizza dough is cooked by itself, more moisture (i.e., water vapor) escapes through the top of the dough than would be the case if the dough were cooked with topping applied. This is because at least some of the topping is of low moisture vapor permeability and thereby acts as a barrier to the escape of moisture vapor driven from the top of the pizza by the cooking procedure. When the moisture vapor barrier (i.e., the topping) is not present, more moisture vapor can be driven from the top of the dough. This results in a drier dough product.

When a pizza dough is cooked by itself, the absence of a thermal insulating barrier (i.e., the topping) results in the formation of a very thin crust of film on the top as well as the shoulder (or rim) and sides of the pizza. This is because the dough is coming into direct contact with the heat from above. This thin crust or film creates a "mouth feel" which is foreign to the expectations of the pizza consumer. The difference is similar to the difference between toasting a piece of bread and then putting jelly on it, versus toasting a piece of bread with jelly on it during the toasting process. They both have a crisp bottom, but the latter has a soft upper bite and the former has a relatively tougher, drier upper bite once the topping portion has been passed.

4. When a pizza dough is cooked by itself, the top cooks faster than the bottom because the top is exposed directly to heat while the bottom is insulated by the pan which contains the dough. As a result, if the goal is a crisp underside, often the top must be overcooked in order to achieve the desired underside. This compounds the problems defined in (1), (2) and (3) above.
5. When a pizza dough is cooked by itself, the bottom of the pizza dough may not be sufficiently maintained in contact with the top surface of the pan bottom. As a result, the bottom of the par-baked pizza is typically white and undercooked (unless the top of the pizza dough is overcooked as described above). Ideally, the entire par-baked pizza bottom would be lightly browned and crisped, resulting in an even distribution of white and brown on the bottom of the par-baked pizza dough.

Thus, during the pizza "cooking from raw" process, the pizza topping acts as a thermal barrier to the top of the dough, protects the top of the dough from direct contact with the heating means, inhibits the migration of moisture through the top of the dough, and by its weight insures adequate contact between the bottom of the dough and the pan for browning of the dough bottom. These advantages are substantially reduced or lost during the par-bake step of a conventional two-step cooking process (i.e., first a par-bake step without topping on the pizza, followed eventually by a cooking completion step with topping on the pizza).

Recognizing that in a one-step pizza-cooking operation (with the pizza "cooking from the raw" with the topping on the top of the pizza throughout), the pizza topping acts as a thermal barrier to heat reaching the top of the dough, protects the top of the dough from direct contact with the heat, and inhibits the migration of moisture from the top of the dough, the McKee '731 patent invention is said to provide an equivalent or superior product formed in a two-step operation wherein the dough is par-baked by providing a topping-substitute, e.g., perforate ceramic disc cover, thereon which emulates the topping in its essential respects. Other prior art commercial par-baking pizza crusts processes have employed overlaid pans for similar purposes.

Although the McKee '731 patent process (as well as other "cover-up" par-baking processes) may well achieve the improved end result in the pizza crust product as stated therein, one obvious disadvantage of the McKee process is the cost to provide and use in production the so called "topping-substitute", e.g., a non-toxic ceramic cover that must be accurately laid on top of the dough of each pizza shell during the par-baking. This of course involves not only expense of providing covers, but also the high labor costs in placing and removing such covers during the par-baking process, and the associated problems of maintaining quality control in a mass production process.

In any event, the critical test of any solution of the "cook from raw" dough problems is that the end result must be essentially at least as good as and preferably better than, the freshly prepared product (i.e., the product cooked in one-step from the raw dough with topping on it).

Additionally, it is important to understand that any real solution to the raw dough problem must be adaptable to existing food products. There are several restaurant chains, each with numerous (in some cases thousands of) restaurant units. Their products are well entrenched within the restaurants' customer base, and any perceived change in the product may result in a change in consumer acceptance and possibly, a decline in sales.

To summarize, the problem is that a dough cooked uncovered in two steps (i.e., a dough initially par-baked without topping or other covering on it) yields a different pizza crust than a dough cooked in one step with topping on it throughout the cooking process, the characteristics of the two-step dough pizza being less desirable than the "cooked from raw" or one-step dough pizza. In other words, the long standing problem remains to be solved, namely, how can the changes which occur during the one-step cooking process of a raw dough pizza be successfully and economically emulated in a commercial par-bake environment?

OBJECTS OF THE INVENTION

With these defects of the prior art in view, one object of the present invention is to provide an improved process for the preparation and distribution of baked food products.

Another object is the provision on an improved process by which baked food products may be made and distributed in a form requiring no preparation by the housewife or bakery store prior to final baking.

A further object of the invention is to provide such a process which is applicable to baked products containing yeast or a chemical leavening agent.

Another object is the provision of an improved packaged baked product in which all critical portions of the baking operation have taken place prior to distribution to the consumer.

Still another object is the provision of an improved packaged food product which has been subjected to a preliminary baking step in which the desired leavening action is completed and arrested, so that the consumer or bakery store personnel can quickly complete the baking of the product in a home or store oven, without particular preparation or chances for error.

A further object is the provision of an improved method of baking yeast-raised products to a point of full volume and rigidity without any semblance of crust color.

It is also an object of the present invention to provide an improved method of par-baking a foodstuff ,such as a pizza crust pre-cursor, without topping on it so as to yield a baked dough at the end of the second (with topping) step similar to a dough baked in one-step from the raw dough with topping on it.

Another object is to provide an improved two-step baking method which produces such a product indistinguishable from the one-step industry standard product, but which method can also fit easily into the existing industry processes.

A further object is to produce an improved foodstuff par-baked by such a method.

A more specific object of the present invention is to provide an improved method of making a frozen food product, such as pizza, which favorable compares to or is better than a made-to-order pizza.

It is a related object of the present invention to provide an improved method of making a frozen food pre-cursor product, such as a pizza shell, which can be used, for example, in making a pizza which at least favorably compares to a made-to-order pizza.

It is another related object of the present invention to provide an improved pizza shell made by the previously noted method.

More particular objects of the present invention are to provide a new and improved frozen parbaked pizza crust adapted for subsequent in-filling with pizza ingredients and finish baking therewith, and to provide such crust with improved hydration (38% –40% moisture retention even after parbaking and freezing), improved look and finish, improved durability due to a starch encapsulating layer, longer shelf life, improved resistance to syneresis (resistance to moisture migration from the pizza sauce to the crust during finish baking), improved resistance to mold, improved resistance to stickiness of the crust when stacked (unwrapped) after freezing and improved crisp textural properties upon final baking with sauce and topping, i.e., crust is crisp on the outside and soft on the inside.

Further objects are to provide a new and improved formulation for making pizza crust of the aforementioned character which is particularly adapted to being processed by the improved process and apparatus of this invention, and wherein the recipe or formulation for the starting material used in the process is improved from the standpoint of providing improved leavening action and moisture retention by combining four preselected ingredients into the formulation that allow the leavening action to continue from initiation in the mixing process on through the baking process, providing improved moisture retention and moisture absorption by utilizing further preselected ingredients in the formulation, and enhancing the mouth feel of the finished crust as well as its flavor by utilizing another preselected ingredient, utilizing still another selected ingredient in the formulation to improve the machinability of the dough and make it more extendable to thereby make it easier to process the material through the automated processing apparatus, and utilizing yet another selected ingredient to thereby retard the formation of mold in the finished product during storage thereof.

Another object is to provide an improved process for making pizza crust of the aforementioned character that is efficient, reliable, economical, adaptable to automation, can utilize commercially available equipment in various stages of the process, and that is readily adjustable stage-to-stage and within each stage.

Yet another object is to provide an improved apparatus and processing system for performing the aforementioned process for making the aforementioned parbaked and frozen pizza crust product of the process, including an improved machine for pressing a dough ball pre-form in two stages with the second stage being heated, and an improved apparatus for steam treating and parbaking a proofed pizza crust, and improved corn-meal-applying machines.

SUMMARY OF THE INVENTION

In general, and by way of summary description and not by way of limitation, the new and improved pizza crust of the invention is made in an improved process of the invention that incorporates in the illustrated exemplary but preferred embodiment approximately fifteen to twenty steps following after a first step of providing a pre-mixed novel formulation of the invention as a starting material that is made as set forth hereinafter. The process as illustrated schematically and labeled in FIG. 1 includes the following steps numbered 20–68, preferably performed sequentially in the numbered step order and as listed hereinafter:

1. Mixing the pizza dough pre-mix formulation on a batch basis or continuously (FIG. 1; Steps 20, 22 and 24);
2. Dividing the mixed material from the mixing step in a divider to produce uniform measured pizza dough pieces in a timed output on a continuous basis (FIG. 1; Step 26; FIG. 2);
3. Individually forming the dough pieces into round balls in a rounder operation (FIG. 1; Step 28; FIG. 2:);
4. Individually coating the rounded dough piece balls with vegetable oil in a "downhill-roll" oiler station (FIG. 1; Step 30; FIGS. 2 and 3);
5. Allowing the rounded and oiled dough piece balls to "rest" for a given time period while riding on a soft pliable nylon net conveyor basket in an overhead intermediate first proofer station (FIG. 1; Step 32; FIGS. 2 and 3);
6. Individually loading the first proofed dough piece balls into an associated forming pocket of a transport tray or pan (FIG. 1; Step 34), and then cold forming panned balls into a dough pressing of predetermined preliminary shape (FIG. 1; Step 36); allowing the first pressed pieces to rest for a given time period (FIG. 1; Step 38); and then second pressing the pieces to hot (warm) reform the same into a product outline shape configured for forming the desired final pizza crust shape (FIG. 1; Step 40);
7. Loading the panned pressings into storage rack wheeled carts which are put into a final proofer station to allow the yeast and/or other leavening agent(s) to continue working and the pressing to rise under predetermined controlled conditions of time, temperature and humidity (FIG. 1; Steps 42 and 44);
8. Removing the carts containing the final proofed pressings from the proofer, unloading the pans from the cart racks and introducing the panned pressings onto a conveyor that goes through a steaming station to thereby hydrate the proofed pressings under predetermined conditions of time, temperature, pressure and steam impingement (FIG. 1; Step 46);
9. Conveying the steamed and proofed panned hydrated pressings through an impingement convection oven to parbake the pre-steamed and hydrated pressings sequentially in three oven zones controlled in accordance with predetermined parbake oven operating parameters (FIG. 1; Step 48);
10. A cooling stage wherein the panned parbaked crust product is removed from the output of the oven and is cooled on pan racks down to about 90° F. (FIG. 1; Step 50);
11. Applying corn meal onto each parbaked pressing (FIG. 1; Step 52; FIGS. 12–13; FIGS. 14–15).
12. A fast freezing stage in which the panned parbaked crust products, after being so cooled to 90°, are de-panned and individually placed on a freezer conveyor and quick frozen while so conveyed to thereby produce a completely frozen parbaked pizza crust product, but with a temperature gradient remaining between surface and interior sub-freezing temperatures of each such product (FIG. 1; Step 54);
13. The frozen product is then transported to a packaging station where the product first passes through a metal detector and then is automatically machine packaged individually within a clear plastic wrap (FIG. 1; Steps 56 and 58);
14. The wrapped and carton packaged product is then transported to a holding freezer where equilibration occurs by holding the product for a predetermined time at a predetermined freezer temperature (FIG. 1; Step 60);
15. The packaged product is then moved from the holding freezer to a warehouse freezer storage facility and stored at 0° F., ready for shipment to a Pizza Kit assembly area or to a distribution center for distribution to a Pizza Kit assembly facility and/or to individual pizza baking retail stores (FIG. 1; Steps 62, 64, 66), and
16. Fill crust with topping and final bake (FIG. 1: Step 68).

BRIEF DESCRIPTION OF THE DRAWINGS

The foregoing as well as additional objects, features and advantages of the present invention will become apparent from the following detailed description, appended claims and accompanying drawings illustrating improved apparatus provided and organized in a production line system in accordance with the invention as set up in a manufacturing and research facility and operable for a pilot run operation to perform the improved process of making the improved parbaked frozen pizza crust, all in accordance with the invention, and wherein:

DETAILED DESCRIPTION OF PROCESS, APPARATUS AND PRODUCT PREFERRED EMBODIMENTS

Figure 1:
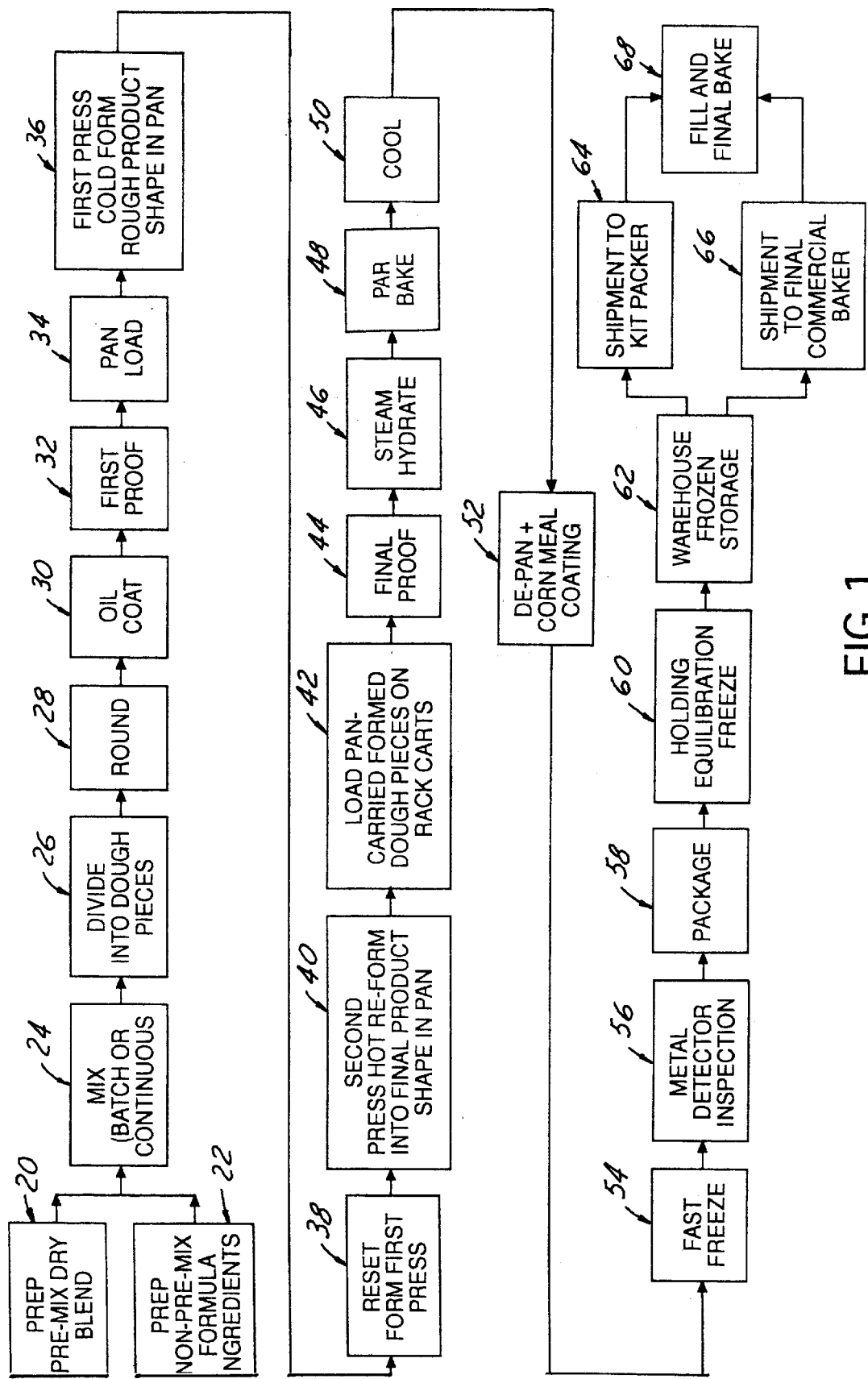
FIG. 1 is a block diagram flow chart illustrating the steps of the improved process of the invention and the organization of the corresponding apparatus to be employed therein as described hereinafter in accordance with the method of the invention to produce the improved pizza crust product of the invention and resultant finished pizza made therefrom.

In exemplary but presently preferred embodiments of the invention, the foregoing process steps, apparatus, formulations and products of the invention are set forth more particularly in, and with reference to, the appended drawings, as follows:

1. Prep and Mixing Steps 20, 22 and 24

Two alternate methods and apparatus may be employed in the prep and mixing steps 20, 22, 24 of the process:

(a) Conventional batch mix, using a stationary bowl spiral mixer (referenced as Step 24 in FIG. 1), for example of the commercial type specified as an appropriately capacity-rated model made by Empire Bakery Equipment Inc. of Hempstead, N.Y. The dough is mixed in one stage (with all the ingredients added at once, pursuant to the formula as specified hereinafter, for 1 minute on low speed and 4 minutes on high speed. The dough temperatures should be approximately 90° F. at the end of the mixing step. (b) Continuous mix, using a commercially available mixing system (also referenced in Step 24 in FIG. 1), for example of the type specified as an appropriately capacity-rated ingredient metering, continuous mixing and control system as designed, manufactured and installed for mixing pizza dough by Exact Mixing Systems, Inc. of Memphis, Tenn. All the dry and liquid ingredients of the aforementioned formula are fed to the initial mixing chamber (the incorporator) from their own vessels that are continuously filled by the operator(s). These blended ingredients transfer to the second mix stage (the developer) where the dough receives its final mix. The process from the start of ingredient feed to the end of the mix cycle takes 20 minutes. The dough should exit the mixer at approximately 90° F.

2. Dividing Step 26

In the dividing step of the process (step 26 of FIG. 1) a commercially available divider machine (as shown generally at 100 in FIG. 2; for example, of the commercially available type specified as a Model B84 Single Pocket Dough Divider made by Benier U.S.A. of Mount Prospect, Ill. and Atlanta, Ga.) is used to take the dough from either of the aforementioned alternate mixing steps. The mixed dough is preferably fed via an endless belt power-driven conveyor (not shown) from the output of the continuous mixer into the receiving hopper 102 of divider 100, and thence internally through a system of cooperative piston, slide and knife mechanisms provided in divider 100 to thereby cut the mix into individual dough pieces of the desired weight and feed them out single file on an endless belt output conveyor of the divider.

3. Rounding Step 28

In the next (rounding) step 28, a commercially available rounder machine (as shown generally at 110 in FIG. 2), for example, of the commercially available type specified as a CO5 Series Conical Rounder made by Benier U.S.A. is utilized to form the dough pieces (received at the rounder as cut and dispensed single file via the output conveyor of the divider) into tightened, rounded dough piece balls. These dough pieces, as so processed, are known in the trade as being "rounded".

4. Oiling Step 30

Figure 2:
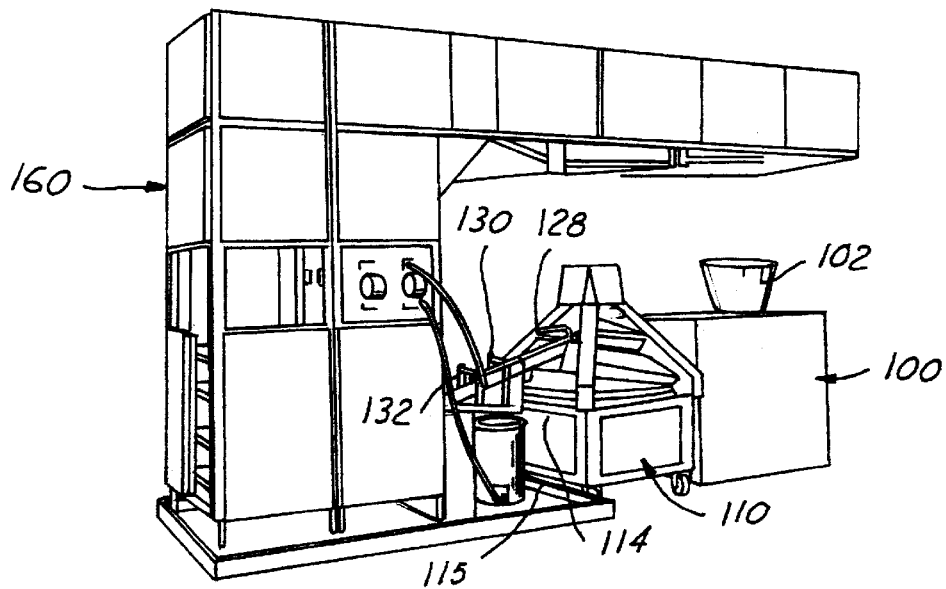
FIG. 2 is a simplified elevational perspective view of portions of the process apparatus employed in the steps of dividing the dough into pieces, rounding the divided pieces, oil coating of the same and transporting the same through a first proof apparatus.
Figure 3:
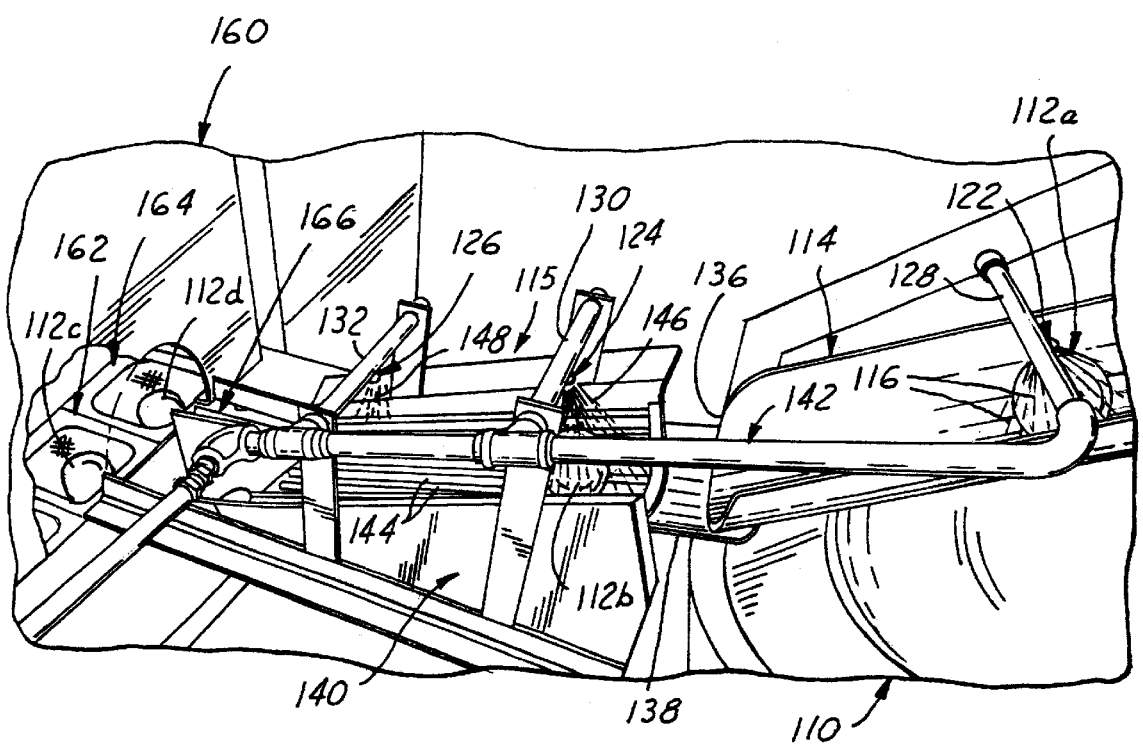
FIG. 3 is a fragmentary perspective view of the oiling station provided at the discharge of the rounder machine and which transports the rounded pieces to the input of the first proofer station and simultaneously provides an oil coating on the pieces as they are gravity rolled down through the oiler station from the rounder to the input of the first proofer apparatus.

As shown in FIGS. 2 and 3, the aforementioned commercial Benier CO5 Series rounder is modified in accordance with one feature of the present invention to provide an output chute oiling system to thereby perform oil coating step 30. As each of a series of rounded dough balls 112a, 112b, 112c, 112d exits the rounder (FIG. 3), it first travels downwardly in an inclined stainless steel closed bottom trough chute 114 and therein through an associated first oil bath 116 of vegetable oil issuing from a spray nozzle 122. As each of these dough balls rolls further down an associated downstream plural rod open bottom chute 115, it picks up a further covering of oil issuing in spray form from two additional spray nozzles 124 and 126. Nozzles 122, 124 and 126 are respectively mounted on oil supply pipes 128, 130 and 132 that are horizontally supported over the downhill travel path of the dough balls in the manner shown in FIG. 3.

The lower exit end 136 of chute 114 is disposed spaced vertically above an inclined input apron 138 attached at its downhill end to the entrance of the downstream chute unit 115. This spacing of the outlet end 136 of chute 114 above apron 138 provides isolation between these chute components of the downhill oiling chute system so that vibrations imparted to chute 114 by operation of the rounding mechanism of rounder 110 are not transmitted to the downstream chute unit 115. Downstream chute 115 is constructed as an open top hopper cabinet 140 adapted to serve as a catch basin for receiving the vegetable oil drainage from the oiling sprays issuing from the nozzles 122, 124 and 126. The oil so collected is recycled through the vegetable oil supply system and fed back to spray pipes 128–132 via the vegetable oil supply pipeline 142 seen in FIG. 3. An array of parallel rods 144 are mounted in the upper region of the cabinet 140 in laterally spaced relationship in an arrangement to form the U-shaped trough configuration that functions as a rolling pathway continuation of chute 114. The oil spray 146 issuing from nozzle 124 and the oil spray 148 issuing from nozzle 126, to the extent not absorbed as a coating on each dough ball passing therethrough, passes through the array of trough rods 144 into the sump of cabinet 140. The excess oil from spray 116 in the upstream chute 114 runs by gravity downhill and trickles out the output end 136 where it is caught by apron 138 and then flows downwardly into the upper end of the rod trough of unit 115 so that it too is collected in the sump of cabinet 140. The three oil sprays 116, 146 and 148, as each dough ball successively encounters the same, along with the light river of oil running down the path in chute 114 and onto apron 138, as well as that on the surface of rods 144, on which each dough ball rolls, combine and cooperate to provide a complete coating of vegetable oil on the entire spherical surface of each dough ball by the time the same reaches the output end of the rounder output chute oiling system.

5. First Overhead Proofing Step 32

In the next step, i.e., first proof step 32, each oil coated dough ball 112a–112d enters the input station of an intermediate overhead proofer unit 160 (FIGS. 2 and 3). As seen in FIG. 3, the rolling dough balls exiting chute 115 are loaded onto the proofer conveyor by dropping into the pocket of a conveyor-suspended tray 162 or 164. Each tray is specially formed, in accordance with a further feature of the invention, from a generally hemispherical nylon net 166 (see FIGS. 4A and 4B) sized to carry up to 3 or 4 of the dough balls, while traveling through the proofing chamber at ambient shop temperature for 10 minutes, before discharging the dough balls at the output station of the proofer to a panning and/or pressing station. The overhead proofer is a commercially available unit, for example, an Intermediate Overhead First Proofer made by Benier U.S.A. Inc. of Atlanta, Ga. equipped with their single intermittent infeed system and double infeed array with mechanical flip-flop device 166.

Figure 4A:
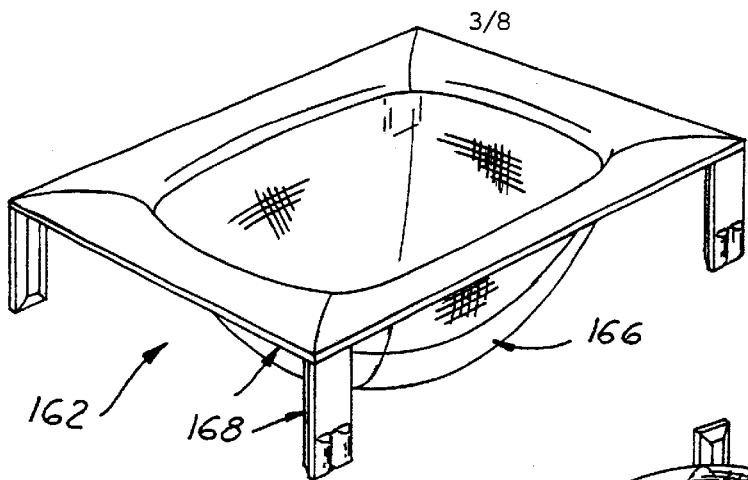
FIGS. 4A and 4B are perspective top and bottom views of one of the improved conveyor baskets provided in the first proofer station apparatus in accordance with the invention.
Figure 4B:
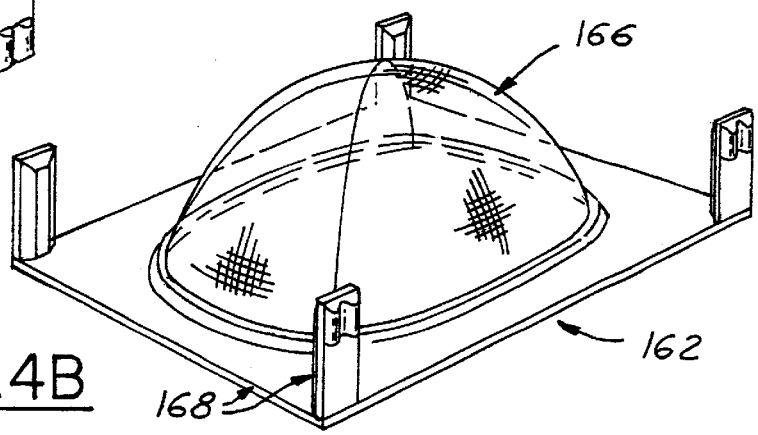

The only modification to this commercial unit is the aforementioned provision of the nylon netting 166 in each of the double or side-by-side tray units 162 and 164. FIGS. 4A and 4B illustrate one of such tray units 162 in which the metal framework 168 is not changed but the initial tray pocket material is replaced with nylon netting 166 to provide a highly perforate, soft and very flexible pocket for receiving the dough ball pieces and for transporting them through the proofer without damage or fracture of the rounded dough balls.

6. Panning and Pressing Steps 34–40

A. First Embodiment

In one embodiment of the process for making 6 inch diameter round pizza shells, a single warm pressing step is performed by a commercially available hot press (for example, of the type specified as a "LEGEND" Series Model 4×4 Plus Pizza Press made by Lawrence Equipment of South El Monte, Calif.). The pressing is done in this pizza press on individually conveyed dough balls hand placed on a Teflon infeed belt without using a pan. Each dough ball is manually placed on the infeed belt by being spotted on its light marker, and then conveyed under the pressing platen where it is flattened into the desired round shape of the round pizza crust shell being manufactured. The pressing temperature ranges from 260° to 300°, depending on the type and/or of pizza shell being produced. The dwell time (the time the press is pressing the shell) runs from 1 to 4 seconds, depending on the type and/or of pizza shell being manufactured, and the pressure of the press is 200–250 psi. After pressing, the pizza dough crust pressing is transferred to a downstream inclined discharge conveyor also provided on the machine where it is panned by an operator holding the pan under the discharge conveyor.

B. Second Embodiment

A series of different and preferred panning and pressing steps 34, 36, 38 and 40 are schematically illustrated in FIG. 1 using two presses arranged in tandem that sequentially press dough pieces carried in a pan that is initially loaded at the output station of the proofer 160. These presses are specially made "pass-through" modifications of commercially available pizza crust hydraulic forming presses, and are designed for the first to press cold, but the second is modified to press warm. The first pressing is at ambient temperature, whereas the second pressing is set between 260° to 300°, depending on the type of crust being manufactured. The dwell times range from 1 to 2 seconds. The pizza-loaded pans are fed by one operator into one side of the press and removed by another operator at the other side of each press. Again, the pressure at each stage is between 200–250 psi.

More particularly, the two stages of pressing are performed with commercially available pizza crust hydraulic forming presses that are modified in accordance with a further feature of the invention. The first stage press for example, may be a Model PSI-75 Pizza Crust Hydraulic Forming Press made by Pizza Systems, Inc. of Pataskala, Ohio. As commercially designed and made, this press is intended as a single-operator-attended press with loading and unloading being performed by one operator from the same side of the press. As modified in accordance with the invention, the press is converted to a pass-through type press, with one operator loading an array of pizzas as carried on a multiple pizza pan into one side of the press, and another operator on the output side unloading the tray after the pressing operation is completed by the press.

Figure 5:
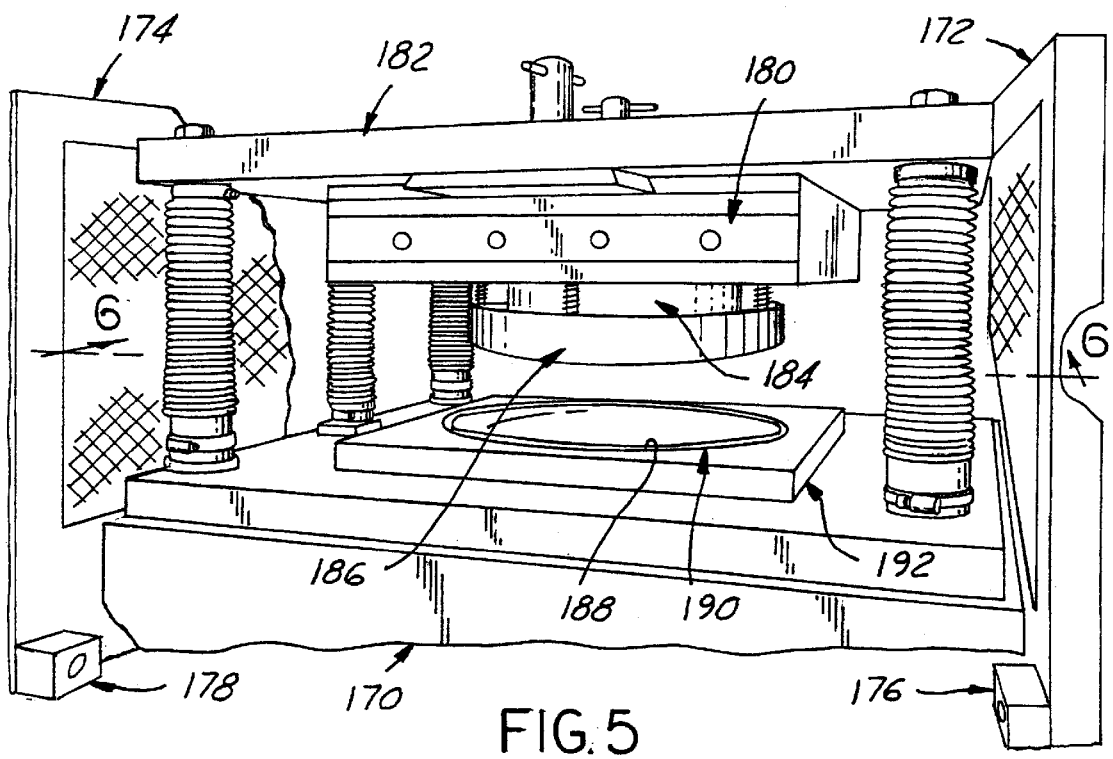
FIG. 5 is a fragmentary perspective view of one form of modified dough pressing apparatus usable in the second press hot reform step of the method with certain parts removed for ease of illustration.
Figure 6:
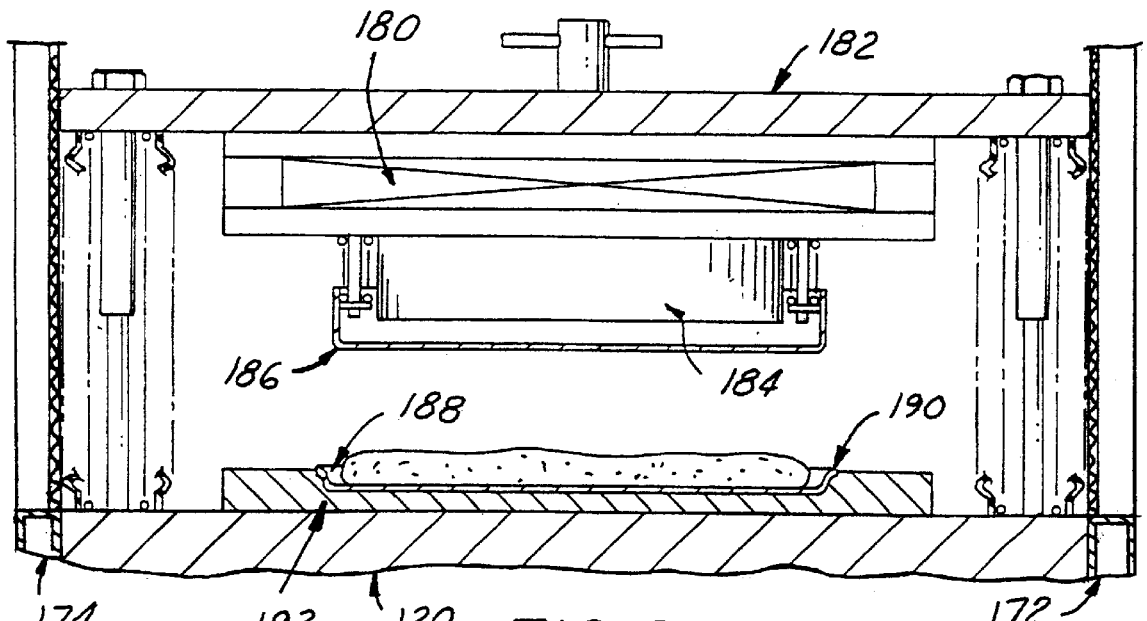
FIG. 6 is a vertical sectional view taken on the line 6—6 of FIG. 5.

In order to render this operation safe for such modified design and operation, the aforementioned Model PSI-75 Pizza Crust Hydraulic Forming Press is factory modified in accordance with the invention to provide a pair of flanking side guard fences 172 and 174 shown in simplified form in FIGS. 5 and 6. The drive mechanism of the machine is mounted in a cabinet base 170 and the side panels of this base are used as supporting framework for safety fences 172 and 174. These fences stand clear of the moving parts of the upper part of the press and extend horizontally approximately two feet outwardly from the input and output facing panels of base cabinet 174. Fences 172 and 174 thus provide a protective side barrier for each of the opposite sides of the loading area, and also for the unloading area at the opposite side of the press.

The output or unloading side of the press is shown in FIG. 5 wherein it will be seen that the lower outer laterally juxtaposed corners of fences 172 and 174 are provided with suitable operator actuated control units 176 and 178 with press control buttons associated therewith wired so that the unloading operator controls the pressing operation. Each of the units also includes an infrared safety beam that projects across the space between units 176 and 178 to disable the press in the event the beam is blocked by the operator. Accordingly, the operator must stand outwardly of the controls 176 and 178 in order for the machine to be enabled for operation. At the input side of the machine the fences 172 and 174 are likewise provided with similar infrared detectors positioned at the fence lower outer corners and which likewise project a beam therebetween which if broken by the loading operator likewise disables the machine from operation. Hence, both the loading and unloading operators must back away from the respective beams and clear away from the machine before the same can be operated. In addition, the start buttons of the machine, one on each side of the unload station, must be pressed simultaneously by the unload operator, using both hands, in order to start the operating stroke of the press.

For the warm press second stage operation, the aforementioned PSI-75 Pizza Crust Hydraulic Forming Press is further modified to add a heating element container block or carrier 180 (FIGS. 5 and 6) fastened to the underside of the upper platen 182. The pizza pressing platen 184 of the machine is fastened directly to the underside of the heating element carrier 180 for heat transfer conduction directly from the heating elements into the pressure platen 184. Platen 184 is surrounded by and has a lost motion relationship with a tray clamp presser shoe 186 that is configured to extend beyond the margins of the pizza-containing and-mold forming pocket 188 of the tray pan 190. In FIG. 5 tray 190 is shown in simplified form, as a single pocket pan for a round pizza, it being understood that the pans are typically multi-cavity, preferably dual-pocket pans in actual practice of the process when making 12-inch square pizza crust, for example. When the upper platen 182 of the press descends on its working stroke, the presser shoe 186 first engages and clamps the margin of the tray pocket 188 and thereby clamps and holds tray 190 firmly on the workpiece or tray-locating platform 192 of the press. Then further downward travel of platen 182 brings the pressure platen 184 with its underside into engagement with the dough in the pocket of the press to perform the pressing operation.

As indicated by the steps sequence flow diagram of FIG. 1, step 34 comprises manual loading of the first proofed round dough pieces into the molding pockets of the pan tray. In step 36, the aforementioned modified PSI Hydraulic Forming Press, but minus the heating elements, is employed to first press cold form the rough dough product into the preliminary shape of the molding pocket in the pan, i.e., round for round pizza or square for square pizza etc. This first pressing is performed at ambient temperature. In the case of a pan containing two pockets, the press is equipped with dual piston pressers that can simultaneously press two initially proofed dough pieces that are loaded one each in the associated pan recess or forming pocket of a double pan. Inasmuch as the pressing in this station is done at room temperature, the press platens are not heated. After the first press stage of step 36, step 38 is performed in which the first press pans are unloaded from the first stage press and loaded on the conventional ladder rack wheeled carts and allowed to stand thereon at room temperature for 5 minutes. This allows the dough to spring back and stabilize after this first pressing and to thereby render the first pressings ready for a second pressing stage of step 40.

As indicated above, the second pressing step 40 uses again the modified press machine of FIGS. 5 and 6 (but equipped with a dual presser platen set up in the case of making a dual-pocket square pizza in a tray so configured). With the heater elements in block 180 energized the heat is applied to the pressed piece in this station as squeeze pressure is applied by dough presser 184. The second stage press as so modified with heater elements to operate as a warm press is operated to maintain the underface of the pressure platen 184 at a temperature at or slightly below approximately 290°. This "warm" pressing in the second stage imparts to the pizza dough a pressing characteristic that is desirable to configure the same out to the outer limits of the associated tray molding pocket but without "frying" the product, i.e., without giving it excessive heat and making it too firm.

After the second pressing, the pressing machine is unloaded by manually removing the pan carried formed dough pieces, and then the same are loaded on ladder rack wheeled carts as indicated in step 42 in FIG. 1, ready for transport on the carts to final proofing in step 44.

7. Cornmeal Sprinkling Step: First Embodiment

In a first embodiment of the process (now superceded), cornmeal is placed on pans by hand sprinkling prior to the dough pieces being placed on the pan and after being single stage warm pressed as described above in Section 6A. The pans are then placed on a ladder rack wheeled cart (not shown) that is rolled into the final proofer shown as step 44 in FIG. 1.

8. Final Proofing Step 44

In both the first and second process embodiments the wheeled carts, when full of racked pans carrying the pressed pizzas, are pushed into the final proofer via the proofer infeed doors provided at one end of the final proofer cabinet. After 20 minutes residence time in the final proofer, the carts are pushed through the proofer cabinet to the opposite output end of the same, where an operator pulls them out for transfer to the hydration steaming step 46. The controls for establishing the final proofer interior proof box environment are preferably set for approximately 105° F. heat and 85% humidity. The final proofer is a commercially available unit of the type, for example, specified as a Model GP 122, GP 142, GP 182 or GPR 122 made by Gemini Company of Philadelphia, Penn.

9. Steaming Hydration Step 46

In accordance with a principal feature of both embodiments of the process of the invention, the pan carried pressed pizza pieces are processed through a steam hydration step 46 after completion of the final proofing step 44 and prior to the parbaking step 48. In accordance with a further apparatus feature of the invention, the steaming apparatus has been specially designed and constructed to accomplish the objects of the invention as described in detail hereinafter.

The complete steaming station apparatus 200 appears as shown to engineering scale in FIGS. 7, 8, 9 and 10. The panned pizza shells are unracked from the ladder cart and placed on the infeed end 202 of the steamer conveyor belt 204 (39" wide stainless flatwire belting) as soon as they are removed from the final proofer. As they are conveyor transported they enter a steam tunnel 206 at a shell temperature of approximately 90° F. to 100° F. and exit tunnel 206 at the output end 220 of conveyor 204 at a minimum shell temperature of approximately 135° F., and preferably about 159° F. Tunnel 206 is always open at both of its longitudinally opposite input and output ends 208 and 210 respectively, and has exhaust hoods 212 and 214 and associated ducting 216 and 218 provided for each open end of the tunnel, and there is no tunnel venting therebetween.

Due to the pan-carried, pressed and proofed pizza crust shells spending a total of approximately 35 seconds on the speed-adjustable constant speed conveyor 204 (e.g., 14 feet per minute) in tunnel 206 of steamer 200, this novel "steam bath" apparatus performs the pizza steam hydration step 46 and also simultaneously starts the pizza crust parbaking process. After exiting steamer conveyor 204, the steamed pizza shells transfer directly and immediately from the output end 220 of steamer conveyor 204 automatically onto the endless chain belt oven conveyor (not shown) and are carried thereon into and through the oven baking chambers (see Section 10 hereinafter). Steamer 200 operates with high pressure steam fed at about 35–40 psi into steamer tunnel 206 via two perforated pipes 222 and 224 extending longitudinally therein about 9" above the upper run of the endless conveyor belt of conveyor 204, or about 8" above the exposed upper surface of the panned shells. In one working example the steam is individually supplied to pipes 222 and 224 at approximately 80 psi initial output pressure from an associated one of two Model LB60 electric steam generators manufactured by the Electro Steam Co. (not shown), while operating at their full maximum rated output capacity.

Figure 8:
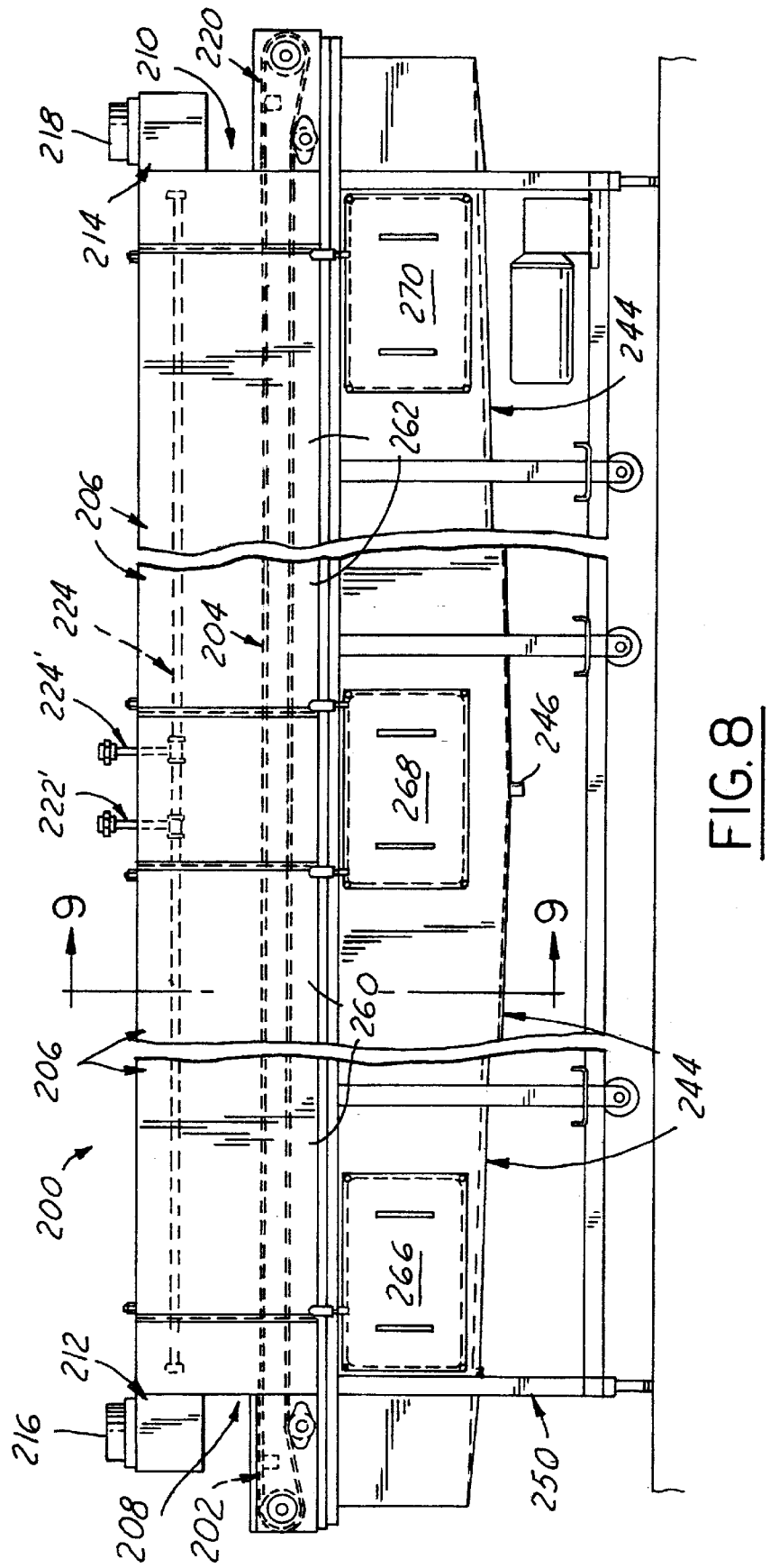
FIG. 8 is a fragmentary side elevational view of the steam hydration apparatus of FIG. 7.
Figure 9:
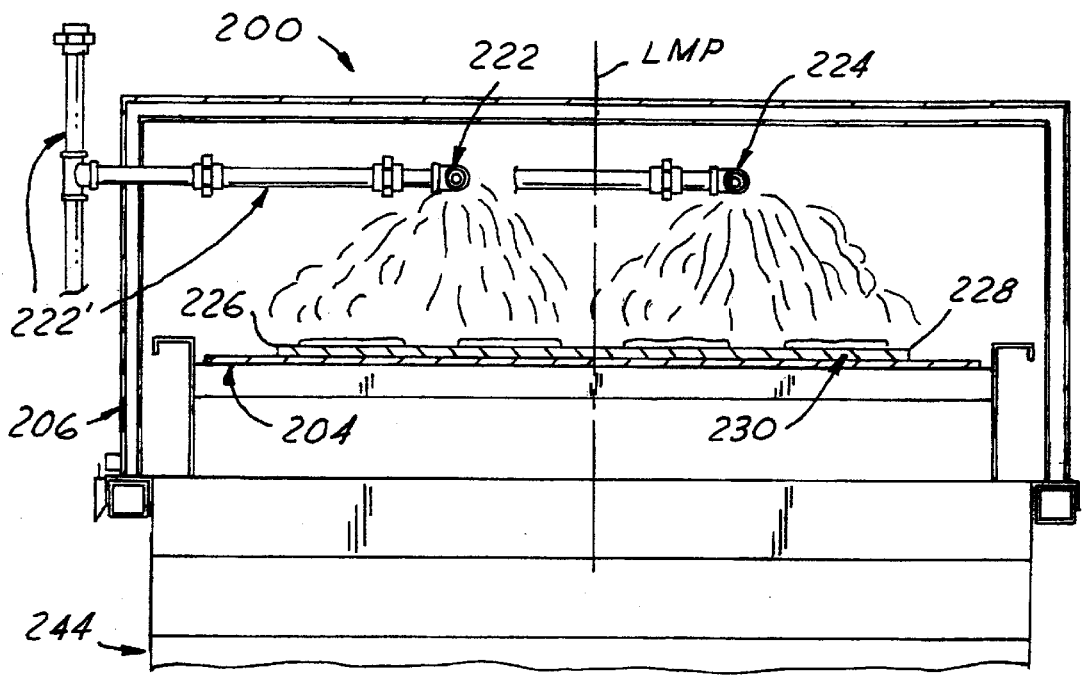
FIG. 9 is a fragmentary cross sectional view taken on the line 9—9 of FIG. 8.
Figure 11:
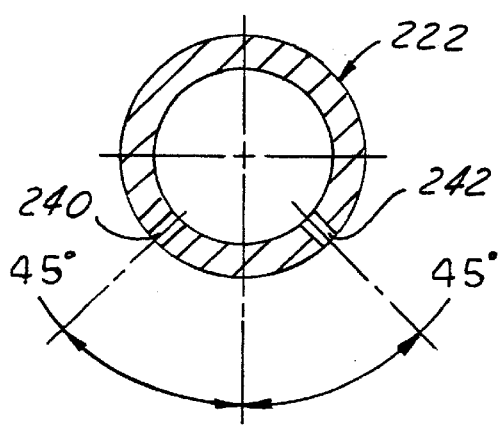
FIG. 11 is an enlarged cross sectional view taken on a line 11—11 of FIG. 10.
Figure 10:
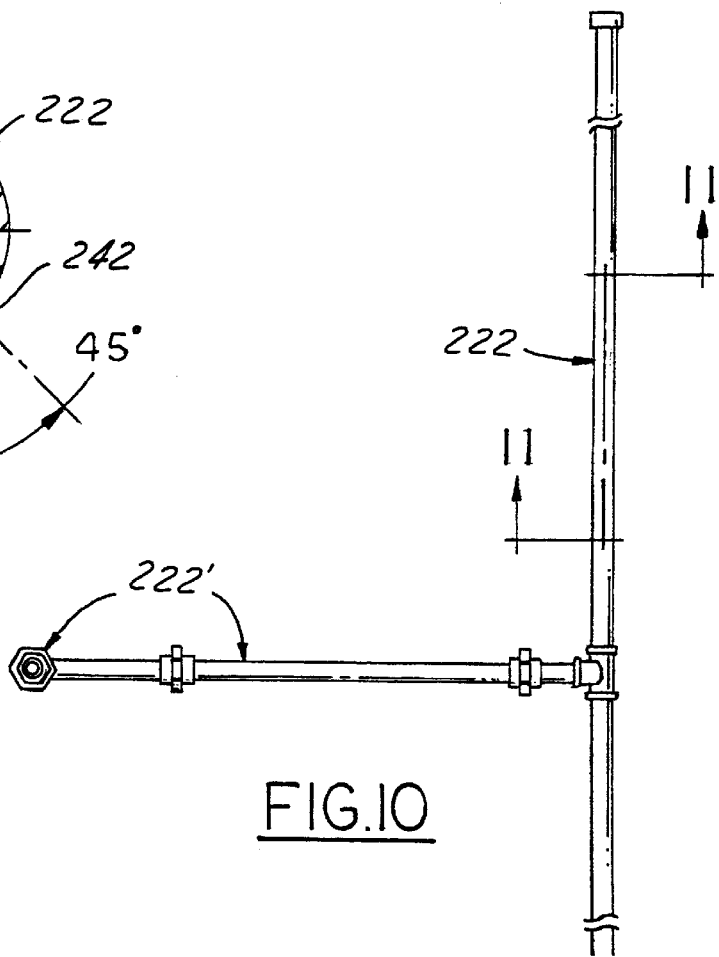
FIG. 10 is a fragmentary plan view of one of the steam supply piping arrangements employed in the steam hydration apparatus of FIGS. 7–9, and shown by itself.

The two perforated steam outlet manifold pipes 222 and 224 are oriented one on each side of the conveyor vertical lateral midplane, indicated at "LMP" in FIG. 9, each pipe thereby being operationally laterally centered approximately halfway between this midplane and the associated side edges 226 and 228 of a multi-shell loaded pan 230 (FIG. 9). In the exemplary tunnel 206 of FIGS. 7–9 pipes 222 and 224 extend about 90" in length, which is almost the full length (96") of steam tunnel 206. Each pipe 222, 224 is perforated by approximately twenty equally spaced drilled holes 240 and 242 (0.062" diameter; FIG. 11) extending vertically downwardly through the underside of each pipe 222, 224. More particularly, as shown in FIG. 11, holes 240 and 242 are staggered relative to one another at angles inclined to the vertical by 45° lengthwise of the pipe, one hole per running foot. This hole distribution and orientation thus provides a steam jet outlet pattern within the interior of tunnel 206 that provides relatively uniform saturated, condensing steam and water vapor coverage of substantially the full width of the upper run of the endless belt of conveyor 204.

Each pipe preferably is normally fed steam via associated supply pipes 222' and 224', by its own foregoing associated LBGO steam generator, but crossover piping (not shown) is preferably also provided along with suitable valving to enable steam delivery cross feed in the event one steam generator is temporarily shut down. A bottom-sloped steam condensate catch tank 244 (FIG. 8) with a central drain outlet 246 is provided within the framework 250 of steamer 200 and disposed beneath the lower run of the open flatwire link type endless stainless steel belt of conveyor 204.

Preferably, the walls, panels and tubular support members of tunnel 206 and framework 250 are all constructed of stainless steel, and all pipes and fittings are made from 316 stainless steel. The conveyor belt is preferably made of one-half inch by one inch heavy duty stainless steel flatwire conveyor belting. The speed of the belt is rated at 40 feet per minute at 60 HZ. The stainless steel piping 222 and 224 is half-inch nominal diameter. The steam tunnel 206 is provided with openable and removable access panels 252, 254, 256 and 258 (FIG. 7) in its top wall, and similar openable and removable access panels 260 and 262 in each of its sidewalls (FIG. 8). Likewise, the condensate collecting tank 244 is provided with clean-out doors 266, 268 and 270 in each of its sidewalls. The sidewalls and top wall construction of tunnel 206 is of preferably formed stainless steel panels, double layer, with insulation material provided therebetween, as shown in the sectional view of FIG. 9.

In the illustrated example of steamer 200, the length of the enclosed steam tunnel 206 is 20 feet, the width of the condensate tank 244 is approximately 4 feet, and the maximum depth of the tank is approximately 2 ½ feet at drain 246. The center line spacing between the steam manifold pipes 222 and 224 is 14 inches. The exhaust fans coupled to the exhaust conduits 216 and 218 of the end exhaust hoods 212 and 214 are vented to exterior ambient, outside of the production facility area, and are operated only with sufficient draw to prevent excessive steam vapor from escaping from the opposite ends of the tunnel to the surrounding work place. Much of the moisture supplied in the steam via the piping 222 and 224 to the interior chamber of tunnel 206 is converted by condensation to water in its liquid state as condensate caught in the tank 244. This steam vapor also condenses on the exposed upper surface of the pizza shells pan conveyed on conveyor 204 through the chamber of tunnel 206, and thence by absorption downwardly through the dough of each shell, thereby providing a thorough hydration of each shell, but not to the extent of showing evidence of water or moisture damage to the pressed and proofed shell dough as it undergoes this continuous travel steam bath process of steam hydration.

Although the temperature of the steam in the steam generator is slightly above water boiling point at 212° F., by the time the steam reaches the steam manifold pipes 222 and 224 within tunnel 206 its temperature has dropped to approximately 170° F. The temperature of the steam as it jets down from the orifices 240 and 242 into the tunnel interior chamber is even slightly lower. Basically the interior of tunnel 206 is maintained with a condensing atmosphere for steam vapor in an environment that provides continuous heat and moisture transfer to the moving pizza shell work throughput material. Of course, due to the perforate nature of the conveyor belt and the spacing between shell loaded pans, as well as between the side edges of the pans and the outer edges of the conveyor belt, much steam vapor bypasses downwardly into the subjacent interior chamber provided by the condensate tank 244 that extends completely below and co-extensively with the interior of the steam tunnel chamber. The excess steam supplied to steamer 200 is picked up my the exhaust system ducting at the opposite open ends of the tunnel and thereby exhausted out to the exterior of the plant (there being no recycling of the generated steam). The steam generating units are essentially run at full capacity without adjustment. Instead, the adjustment of steam moisture treatment of the pizza shells in steamer 200 is done by adjusting the constant speed of conveyor 204 to thereby adjust the dwell time of the pizza shells in their transit of tunnel 206. The downstream conveyor of the associated parbaking oven (described hereinafter) is operated at the same travel rate as tunnel conveyor 204. Hence, when tunnel travel time is adjusted by steamer conveyor speed adjustment, the oven conveyor speed is likewise adjusted to match.

As indicated previously, the travel time of the pizza shells through the exemplary steamer unit 200 described in accordance with the foregoing parameters is about 34 seconds, regardless of the shape and size of the pizza shells being manufactured. Currently the process is successfully run on 6-inch diameter round pizza shells, 9-inch diameter round pizza shells and 12-inch square pizza shells without the need to vary transit time through tunnel 206. However, for a scaled-up steamer unit and associated downstream oven designed for a greater production rate, the dwell time would be adjusted accordingly, for example the same may be about 45 seconds.

It is to be noted that the pizza shells going through steamer 200 are sealed off on their bottom side and side edges by the stainless steel material of the associated holding and molding pans that serve as pizza shell transport trays through most of the process. Hence, the only surface of the pizza shell exposed to the steam is its upper surface. Therefore, the steam being jetted down from the steaming outlet orifices 240 and 242 of pipes 222 and 224 is imparting steam and/or water vapor moisture only onto the exposed upper surface of the shell dough piece and not onto its sides and bottom. However, the steam treatment is sufficiently intense in this steam bath process that moisture penetration occurs throughout the dough of each pizza shell.

In the downstream parbaking process in the oven, (described hereinafter) the same orientation and confinement of the steam-hydrated pizza shells is maintained on the transport trays so that the exposed upper surface of each shell that has been receiving the steam impingement remains as the only shell surface exposed to the convection air heating currents of the convection oven. Hence, to the extent there is imparted in such steam bath treatment a moisture content gradient varying from maximum at the exposed surface of the pizza shell down to the shell bottom surface laying on the stainless steel material of the bottom of the pan mold cavity, reaching a maximum as the shell exits steamer 200, the heating and evaporative action occurring in the parbaking oven is essentially a reverse process insofar as moisture loss then occurs from the pizza shell. Hence, the parbaking becomes complimentary to steaming in tending to thereby render the moisture content gradient smaller and provide a more uniform moisture distribution in the end product exiting from the oven. Nevertheless, the overall alteration of the moisture content imparted by steamer 200 to each shell or dough piece is quite substantial and advantageous.

Likewise, the impartation of moisture into the pizza shell by steaming is advantageous in raising the temperature of the shell dough during its transit of tunnel 206 by approximately 39° F. to 70° F., i.e., from an input temperature of approximately 90° F.–100° F. to an exit temperature of approximately 135° F.–160° F. Hence, the yeast fermentation process that is substantially completed in the final proofing step 44 can continue to a certain extent in the steam hydration step 46 to thereby also assist in moisture absorption by impingement of steam vapor on the upper surface of the pizza shell dough material. The steam heating of the pizza shell in steamer 200 also reduces the ultimate energy input required in the downstream parbaking oven to thereby complete the parbaking process.

A thermal analysis of the pilot run of the process disclosed hereinabove is set forth in Appendix O of the above-identified provisional patent application, all of the photo prints comprising FIGS. 1–74 in said provisional application as well as the data and commercial literature information provided in Appendices A–O attached to said provisional application being available for reference material and in the file of said provisional application, and all of such photo prints and appendices are hereby incorporated herein by reference, as is the Description of said provisional application appearing on pages 1–14 thereof.

The aforementioned thermal analysis had as its stated objective to analyze the existing production process of the initial pilot run set forth in the aforesaid provisional application to provide recommendations for optimizing a production oven in terms of flexibility and thermodynamic capabilities. The steam tunnel 200 of this production line was integrated as a vital part of the process before and in-line with the research and development parbaking oven specified therein. Part of the objective of the study was to identify the influence of the steam on the product, the process and to verify the dimensions of the steam tunnel to be incorporated into the production line.

The lead product produced on the pilot production was the 12-inch pizza crust. Prior to entering the oven the product is exposed to steam in tunnel 206 before parbaking. No actual control setting point was available to this part of the process, but the conditions inside the steam tunnel were recorded and the foregoing construction parameters observed as well as steam operating parameters and conveyor speeds. Testing was done with and without steam in the tunnel. Measured date shows that the steam had a significant impact on the process. The steam-saturated atmosphere in steam tunnel 206 of steamer 200 was found to have a great deal of influence on heat transfer to the product. The rise of the crust temperature I the steam tuner is similar to the rate of temperature increase in the beginning of the down stream parbaking oven. The effect of the steam tunnel was also found to result in higher "end product" temperature. The steamed pizza shell product achieves a temperature slightly above the boiling point as it is being processed within the oven tunnel, which explains why the rate of temperature change levels out and decreases at the end of the parbaking process in the parbaking oven. The air temperature above the pan sensor {logged at 1" above the oven conveyor belt} rises from about 60° C. (140° F.) to about 140° C. (284° F.) during complete parbake oven transit. The effect of the steam tunnel also influences the atmosphere in the parbaking oven, in the early stage of the parbaking process. Inasmuch as the steam is condensing onto the pizza shell product as it transits the steam tunnel and then evaporates in the first part of stage of the parbaking oven, the atmosphere is found to be quite humid in the first zone of the parbaking oven.

The steam was also found to have a significant impact on heating of the pan carrying the pizza shell product. The rise of the pan-temperature in the steam tunnel (about 30° C. to about 80–85° C.) is found to be similar to the rate of temperature increase in the beginning of the parbaking oven (pan-temperature rises from about 60° C. to about 165–174° C. during complete par-bake oven transit). The overall process was also found to reach a higher final temperature (approximately 100° C. at outer edge of crust; 105° C. at base of crust vs. 90° C. and 95° C. respectively, without steam) due to the warmer and more humid conditions at the initial point in the parbaking process when the product was fed from the steaming-hydration treatment in steamer 200. A study of the temperature profile as logged in the testing shows that the parbaking process is finalized or interrupted (as the product exists the parbaking oven) at a stage where the temperature rise curve is still in an up trend and has not yet reached oven environment temperature. This in turn means that the capacity requirement through the parbaking oven is more constant compared to a traditional baking process. As the product and pan temperatures approaches the oven temperature, in traditional baking processes, the capacity requirement reduces. However, this is only partly the case in the parbaking process with upstream steamer hydration as evaluated in the test study.

Based on the lead product (12-inch pizza crust as tested), it was found to be theoretically possible to parbake the desired pizza crust within a time of 1.6 minutes. If a specified throughput is considered to be 20 pans per minute with a pan dimension of 42 inches×42 inches with a band width allowing groups of 3 pans across, a theoretical oven length would be developed of approximately 37 feet (20×42 inches/3×1.6 minutes/12). However, taking into account other practical factors for a production process, it was recommended that an oven allowing a maximum bake time be designed for 2.0 minutes for a full oven load at 20 pans per minute. With a sufficient free space allowed between groups of pans, this would suggest an oven with a baking chamber the length of 59 feet. However, for control purposes the recommended oven chamber length for the above parameters was about 65.5 feet and the actual bake time recommended would be 2 minutes and 12 seconds.

Pilot process testing has also shown that the pizza shell product as it emerges from the parbaking oven as a finished parbaked product has a moisture content of approximately 40% versus a moisture content of approximately 35% without the steam hydration step 46 being practiced on the product between steps 44 and 48. Hence, the final parbaked product contains approximately 14% greater moisture content than hitherto achievable in a conventional "product-uncovered" prior art parbaking process (cf: see Gregor U.S. Pat. No. 2,529,595, Example 3), or for that matter in a complete baking process wherein the product is to be full baked at the output of the baking oven.

10. Parbaking Step 48

The completion of the parbaking action is performed in a commercially available impingement conveyor oven (not shown), and which, for example, is of the type specified as a Meincke Turbu Oven Type 1101 made by Sasib Bakery (company) of Hudson, Ohio. The pizza pans immediately enter the oven upon exiting the steamer 200. The crusts are baked in the range between 1.6 and 2 minutes. The Meincke Turbu brand oven has three foot zones with each set at a different temperature; zone one 550° F., zone two 500° F., and zone three 475° F. About 20% of fresh air is injected into the impingement air nozzles in zone one, using the very extensive oven control panel. The panned pizza crusts exit the oven at a crust base temperature of between 185° F. and 200° F. (85° C. and 93° C.).

11. Cooling Step 50

When the panned pizzas exit the oven in the foregoing pilot run process, they are racked by an operator onto a conventional wheeled ladder rack cart and then moved in front of forced air fans and cooled on the rack for approximately 15 minutes, or for a sufficient time for the internal temperature of the crust to reach about 90° F.

12. De-Panning Cornmeal Coating and Freezing Steps 52 and 54.

A. Liquid Nitrogen Freezing

In an early embodiment of the process, where cornmeal was applied by hand sprinkling between steps 32 and 34, and after the post-par-bake cooling to 90° F., the pizza crusts were depanned by an operator using a spatula, the crusts individually placed on the infeed belt of a liquid nitrogen freezer, (not shown), such as, for example, a Model JE-U4 Cryogenic Straight Tunnel Freezer made by Liquid Carbonic Inc of Markham, Ontario, Canada. This freezer is set at −57° F. and the crusts spend 4 minutes freezing in this machine.

When the crusts exited this freezer, they were at −10° F. on the outside and +15° F. in the interior, and ready for immediate individual plastic wrap packaging.

B. Blast Freezing

The presently preferred method of freezing is so-called "blast freezing" which is a less expensive process and provides an improved way of freezing the crusts. This blast freezer is conveyorized like the nitrogen freezer but is cooled to −35° F. by conventional commercial scale freon (or ammonia) refrigeration. This freezer is of the spiral blast freezer type since its conveyor travels in a descending circle from infeed to discharge. One suitable commercially available spiral blast freezer for performing step 54 is manufactured by the I. J. White Corporation of Farmingdale, N.Y. and is of the type specified as either their EPS or CPS blast freezing systems and associated equipment.

Upon discharge from the freon blast freezer, the product may be handled and packaged in the same manner as the product discharged from the nitrogen freezer.

C. De-panning and Cornmeal Coating Step 52

Figure 12:
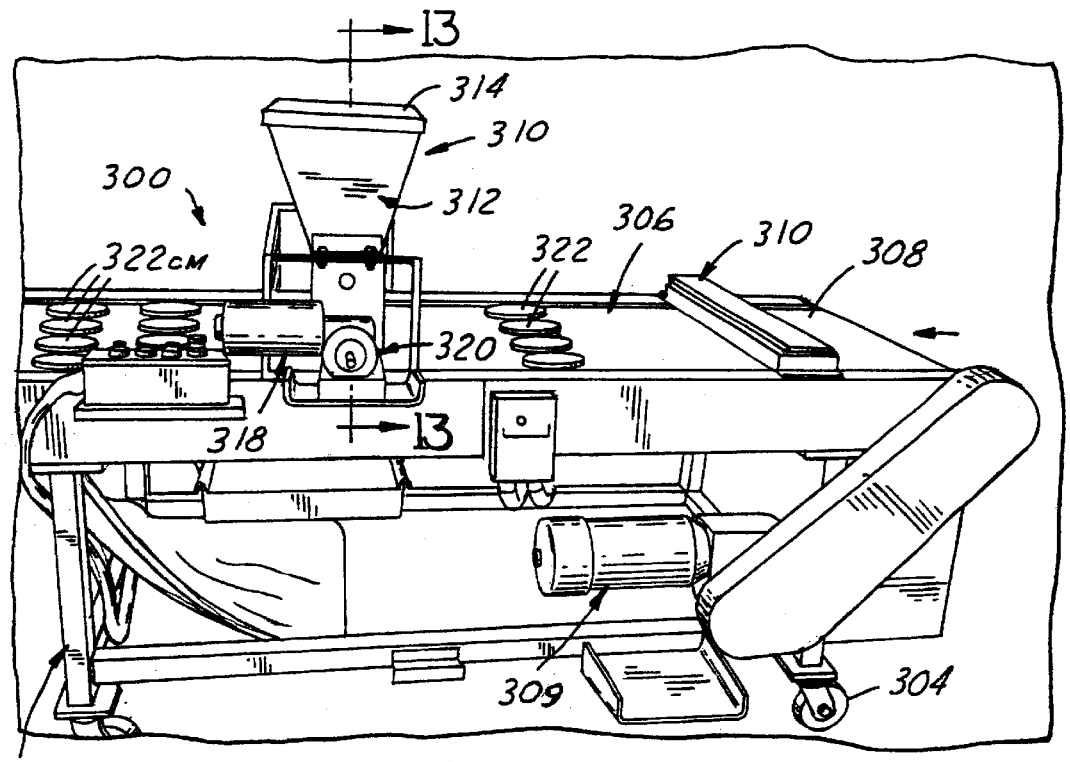
FIG. 12 is a fragmentary perspective side elevational view of one embodiment of apparatus employed in applying corn meal coating to parbaked pizza crust shells or pieces.
Figure 13:
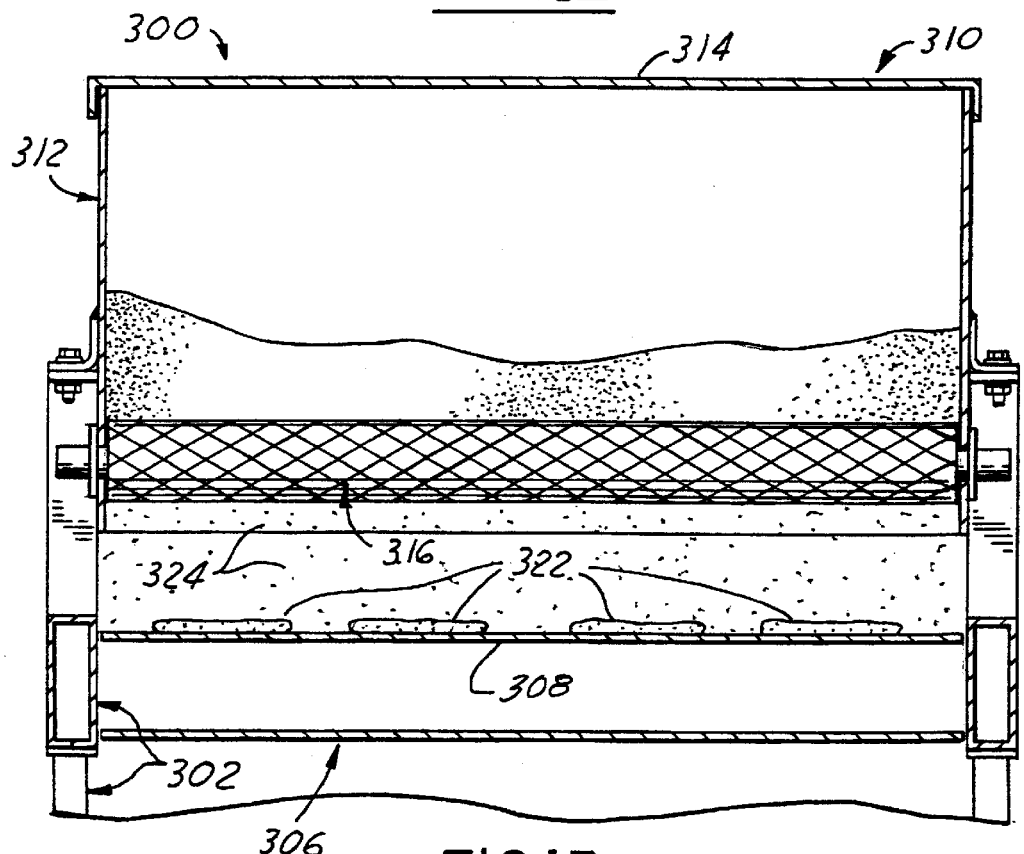
FIG. 13 is a fragmentary cross sectional view taken on the line 13—13 of FIG. 12.

In another embodiment of application of cornmeal to the pizza shell product, a de-panning and cornmeal coating apparatus embodiment is provided as shown in FIGS. 12 and 13 and preferably employed between the aforementioed cooling step 50 and the fast freezing step 54. This apparatus may be a self-contained machine 300 having a suitable framework 302 movably supported on casters 304. Machine 300 includes an endless conveyor belt 306 that is made of food grade nylon or neoprene imperforate material to provide a smooth belt surface, and that is driven by a power drive unit 309 mounted on the framework 302 below conveyor 306. The upper run 308 of conveyor 306 has a bumper bar bridge 310 spanning transversely thereacross and spaced above the run 308 near the input end of conveyor 306. Bridge 310 is spaced downstream a distance sufficient to enable inverted de-panning of a pan load of pizza shells. In this procedure the pan load is unracked from the ladder rack in the cooling station and carried right-side-up to machine 300, then the loaded tray manually inverted over upper run 308 upstream of bridge 310 and then an edge of the pan struck against bar 310 to dislodge the pizza shells from the pan and drop them onto the surface of conveyor upper run 308 upstream of bar 310. In this manner, the pizza shells, after being parbaked and cooled, are deposited on upper run 308 upside down. Hence, the bottom surface of each shell that laid in the bottom of the mold pan cavity now faces upwardly, and the pizza shells are conveyed in this inverted orientation through the remainder of the travel of the upper run 308 of conveyor 306 in machine 300.

Machine 300 includes a cornmeal applying station 310 that comprises a downwardly convergent tapered cornmeal hopper 312 having a removable lid 314 covering its upper open end to enable filling the hopper 312 with cornmeal. The lower end of hopper 312 has an output opening in the form of a slot running transversely the full width of the upper run 308 of conveyor 306. Most of the area of this opening is filled by a feed roll 316 (FIG. 13) that is journalled at its opposite ends in the walls of hopper 312 and rotatably driven by an electric motor 318 via a right angle gear reduction drive unit 320 (FIG. 12). The inverted or bottom-face-up pizza shells are shown by way of example as 6-inch round pizza shells 322 in FIGS. 12 and 13 arrayed in a line of four transversely of the belt in a pattern established by their original array in the pan which was emptied upstream of the bumper bar 310.

As illustrated in FIG. 13, as the pizza shells 322 are conveyed beneath the distribution roll 316, cornmeal particles fall by gravity from the opening of hopper 312, as controlled by rotation of roll 316, and fall onto the upwardly facing bottom surface of the inverted shells 322. Since the shells are still warm (i.e., about 90° F.) from their emergence from cooling step 50, and although parbaked are also still quite moist due to the pre-steaming, the cornmeal tends to easily adhere to the exposed bottom surface of the inverted shells 322 as they emerge from the cornmeal applying station 310 of the machine. The shells being conveyed after station 310 are labeled 322*cm* to indicate they bear cornmeal on their upwardly facing bottom surface, and are ready to be conveyed to the fast-freezing apparatus employed in performing step 54.

D. Third Embodiment Cornmeal Coating Step 52

Figure 14:
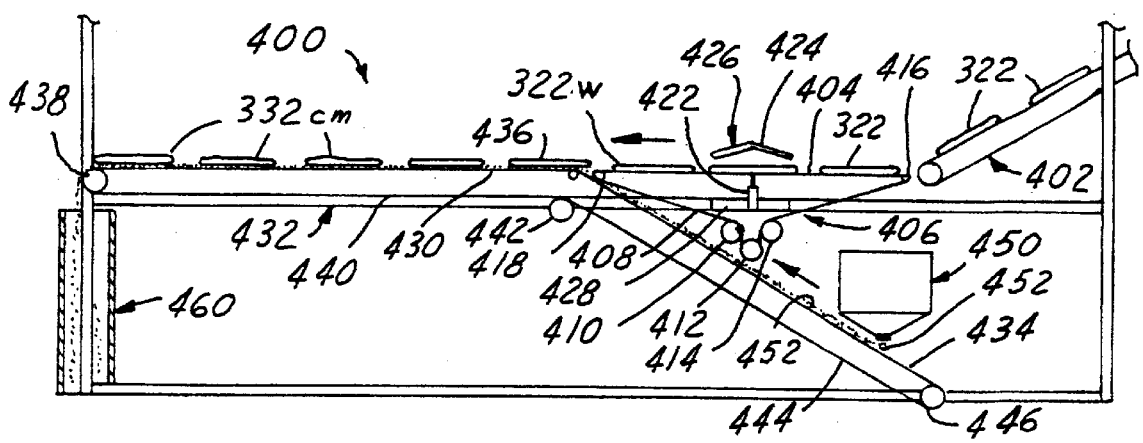
FIG. 14 is a simplified side elevational diagrammatic view of another embodiment of corn meal application apparatus that may be employed in the process in accordance with the invention.
Figure 15:
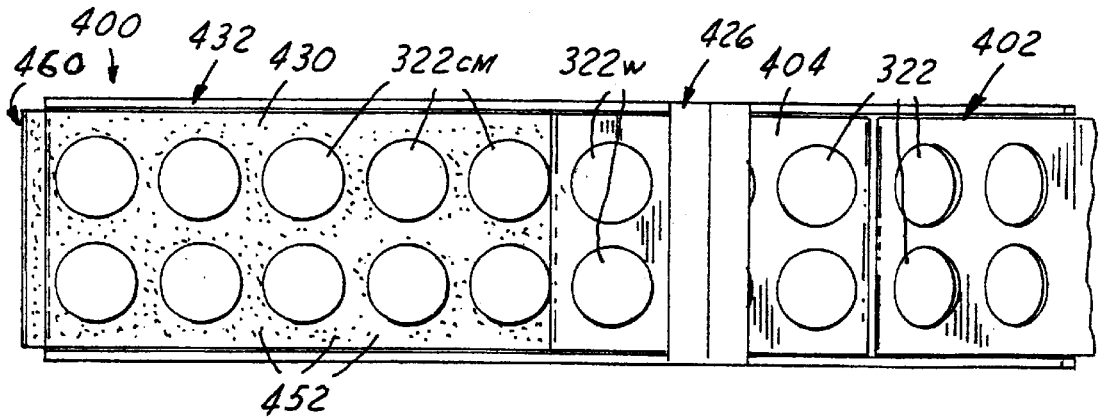
FIG. 15 is a top plan view of the apparatus of FIG. 14.
Figure 7:
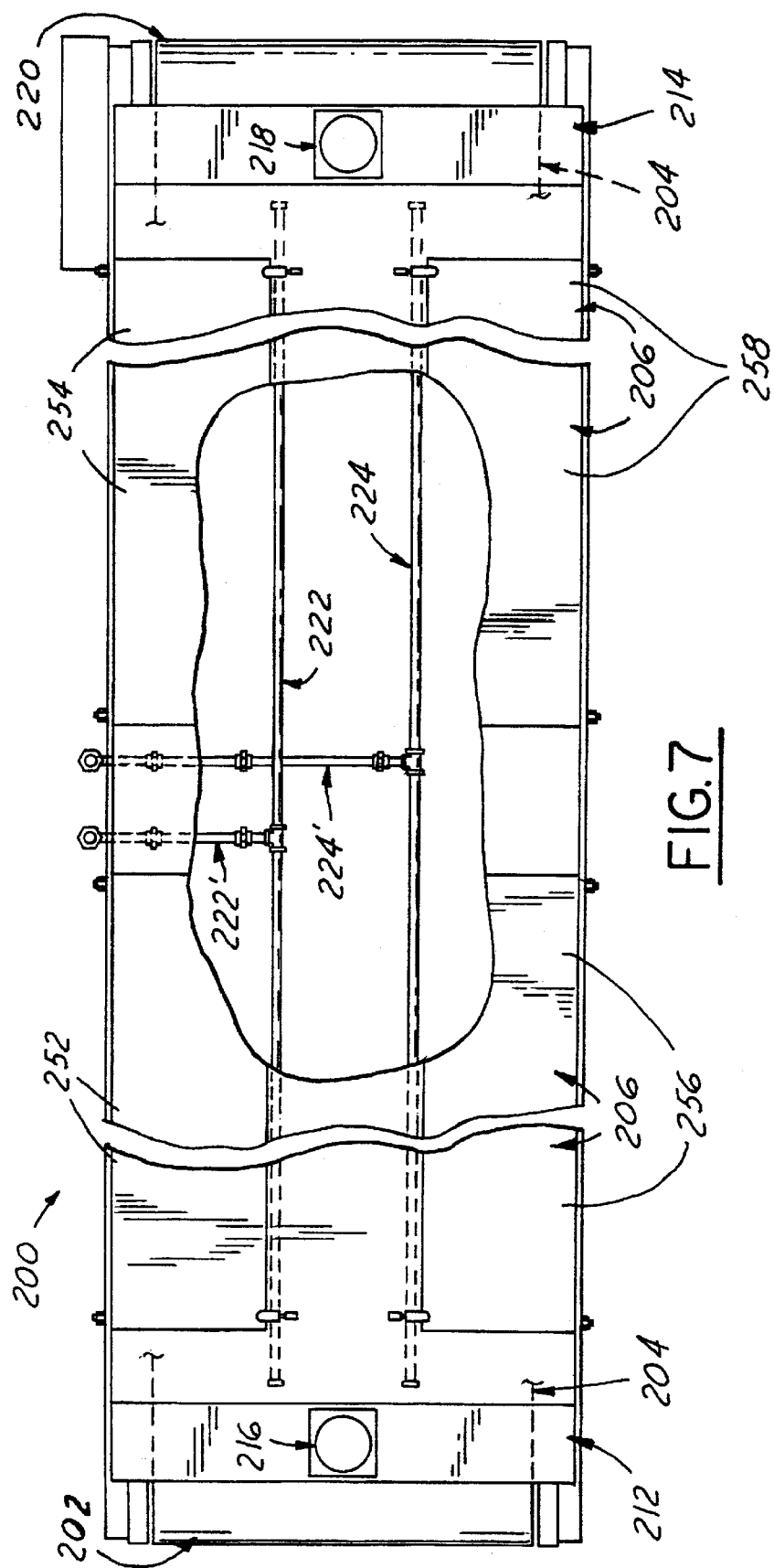
FIG. 7 is a fragmentary top plan view of the improved steam hydration apparatus of the invention employed to steam hydrate the final proofed pressings prior to entry into the parbaking convection oven.

FIGS. 14 and 15 illustrate a preferred apparatus 400 for applying cornmeal to pizza shells in a fully automated set-up. Apparatus 400 may be employed between a conventional conveyorized cooling station adapted to perform the cool down step 50 for cooling the parbaked crusts exiting from the parbaking oven down to approximately 90° F. When a cooling station of this nature is provided, the conveyorized shells are de-panned without inversion so that their normal top surface remains as the upwardly facing surface of the shell as it is conveyorized through a cooling station. The pizza shells as so cooled in a cooling station are conveyed on an endless belt input conveyor 402 of apparatus 400 that emerges from the cooling station output end with pizza shells oriented upright. Pizza shells are propelled by the upper run of conveyor 402 onto the input end of the upper run of an endless chain link belt conveyor 406 that is trained around support and drive rolls as illustrated diagrammatically in FIG. 14.

Note that the lower run 408 of the belt of conveyor 406 is inclined downwardly so as to be progressively spaced further away from upper run 404 as it trains around a first idle roll 410, then beneath a drive roll 412 and then around a second idle roll 414 for return to an input end idle roll 416. The upper run 404 then travels horizontally from idle roller 416 to the downstream end idle roll 418. The endless belt of conveyor 406 is made of open mesh material, such as flat link stainless steel chain links, to render the same highly perforate and yet capable of reliably supporting the parbaked pizza shells 322 during their transit on upper run 404. The central space region between upper run 404 and the lower run 408 of conveyor 406 provides room for mounting a row of spray nozzles 422 (FIG. 14) that are aligned in a row extending transversely of upper run 404 for its full width.

Nozzles 422 are furnished with a liquid supply system (not shown) from a suitable source of supply with associated liquid pump to generate an upwardly directed spray of liquid coating material, the spray jet from nozzles 422 being indicated at 424 in FIG. 14. The liquid coating material thus penetrates forcibly upwardly through the perforate upper run 404 of the conveyor belt of conveyor 406 to thoroughly wet the underside (bottom surface) of each pizza shell 322 being conveyed over the row of nozzles by upper run 404. The overspray or bypass spray that emerges from the nozzles and travels upwardly in the spaces between or around the pizza shells is caught by a gable roof hood 426 spaced above the travel path of shell 322 on run 404. Drippage from the underside of hood 426 falls back through run 404 (as well as to some extent on the upper surface of shells 322 passing therebeneath) and is caught by a collecting tray 428 over which the nozzles 422 are centrally disposed.

The spray material being sprayed from nozzles 422 preferably is a food quality gum solution that may be any suitable blend of cellulose gum and water that is edible, clear and flavorless, and that has sufficient adhesive quality while wet and before drying for adhering cornmeal particles. Hence, as shells 322 emerge downstream from the spray station 422, 426, their undersides are thoroughly wetted by this adhesive solution, and this is the condition of shells indicated 322w in FIGS. 14 and 15.

These adhesively coated shells then transfer from the output end of upper run 404 directly to an upper horizontal run 430 of an endless belt downstream conveyor 432 also provided in cornmeal applying machine 400. As best seen in FIG. 14, conveyor 432 has an upstream inclined upper run 434, disposed below conveyor 406, that travels in an uphill direction over an idle roll 436, where the horizontal portion 430 of the upper run commences. The horizontal upper run 430 then travels to an output end idle roll 438. The lower run 440 of conveyor 432 travels from roll 438 back to an idle roll 442 located spaced below and in the vacinity of idler 436. The lower run of conveyor 432 then travels downwardly as in inclined lower run 444 and is trained around a drive roll 446 from which it leaves as the inclined portion 434 of the upper run of the belt 432.

The inclined upper run 434 passes beneath a feed hopper 450 which contains cornmeal distributing apparatus, similar to the hopper feed apparatus 310 of machine 300, for gravity deposition of a rain of cornmeal particles 452 onto the imperforate upper surface of run 434. The material of secondary conveyor belt 432 is food grade material and imperforate, similar to that of belt 306 of machine 300. Hence, the upper surface of the upper run 434 as it travels upwardly after passing beneath cornmeal applier 450 is covered with a layer of loose cornmeal particles 452, and this covering of cornmeal is carried up to and is present on the upper surface of the horizontal run 430, as best seen in FIG. 15.

Thus, as the pizza shells 322w, with their undersurfaces adhesively wetted, transfer onto upper run 430 of conveyor 432, they are essentially placed upon a loose bed of cornmeal which quickly adheres to each shell undersurface as the shells are placed by conveyor 406 onto conveyor 432. As these shells travel along while resting on upper run 430, their residence time further augments the adhesion of the cornmeal particles to their wetted undersurfaces. The shells thus become pizza shells that have been parbaked, cooled and cornmeal covered on their underside bottom surface, and are identified as 322cm in FIGS. 14 and 15.

The output end of conveyor 432 is arranged to transfer the undercoated shells 332cm directly to an endless belt conveyor that feeds a fast-freezing apparatus for performing fast freeze step 54 described previously, preferably a blast freezer apparatus. Excess cornmeal traveling on the upper surface of the run 430 falls off the output end of the conveyor 432 and is collected by a collection bin 460 suitably disposed for this purpose beneath the output end of conveyor 432, as shown in FIGS. 14 and 15. The collected cornmeal is recycled through hopper 450 for re-application to the conveyor 432.

Due to the adhesive character of the coating applied by machine 400, sufficient cornmeal remains adhered to the shell bottoms even after the shells have been transported through the freezing apparatus, and thus without significant loss of cornmeal therein.

It also is to be understood that machine 400 also can be employed between steps 54 and 56 described hereinafter so that the pizza shells being conveyed onto conveyor 406 are frozen, and the frozen undersurface of such frozen pizza shells is thereby coated with a suitable liquid solution for adhering cornmeal to their bottom surfaces as they travel further on conveyor 432. If machine 400 is interposed between steps 54 and 56 very little loss of cornmeal from de-adhesion to the pizza bottom surface will occur due to the placement of the cornmeal undercoated shells immediately after metal detection and placement onto the packaging in station 58. Any cornmeal loosened at that stage then would be entrapped in the packaging material and remain with the pizza product as stored and shipped.

13. Metal Detecting Inspection and Packaging Steps 56 and 58

The frozen crusts then travel through a commercially available conveyorized metal detector (not shown), for example, that manufactured by the Graseby Goring Kerr Inc. of Amherst, N.Y. (and which is of their type specified as Model TEK DSP). Those frozen crusts passing inspection then travel further on the detector conveyor until they transfer from step 56 and enter, in step 58, the infeed conveyor of a commercially available automatic overwrap L-sealer (not shown), for example, that manufactured by the Shanlin Co. of Ayer, Mass. (of the type specified as Shanklin Model A-26DA). The crusts are heat sealed in a plastic overwrap in this L-sealer, either singly or in a stack of up to three, depending on the type of crust being manufactured.

To complete step 58 the overwrapped crusts are then packaged in a corrugated box, coded with batch and date, labeled and ran through an automatic top and bottom taper, ready for loading directly into a holding freezer.

14. Holding Equilibration Freezing Step 60

After completion of step 58, the boxed crusts are palletized and then fork-lift loaded into a conventional in-plant food holding freezer, which is kept at 0° F. The crusts are kept at 0° F. in the holding freezer for 24 hours, before they are shipped to warehouse freezer storage, to thereby allow complete equilibration and freezing to be accomplished in step 60.

15. Warehouse Frozen Storage Step 62

The packaged product is then moved from the holding freezer of step 60 to a suitable conventional warehouse food freezer storage facility and stored therein at 0° F., ready for shipment to a Pizza Kit assembly area (Step 64) or to a distribution center for distribution to individual pizza baking retail stores (Step 66). Indeed, in a pilot run test facility a refrigerated semi-trailer served well as the warehouse freezer storage facility, which also facilitated transport to steps 64 and 66.

16. Formulation

As indicated previously hereinabove, thermal analysis of the hereinabove described process is set forth in Appendix O attached to the aforesaid provisional application Serial No. 60/099,796, which is also incorporated herein by reference. The ingredient formulation has subsequently been modified and improved by substituting instant yeast for the compressed yeast previously specified. Thus the current and presently preferred improved formula ingredients of the invention, preferably for use in the hereinabove disclosed improved process of the invention for making the improved pizza crust product of the invention, are as follows:

| INGREDIENT DESCRIPTION | MIXING PROCEDURE |
|---|---|
| PREMIX 1 | |
| Ascorbic Acid | |
| Baking Soda | |
| CMC Gum | |
| Glucono Delto Lactone | Dry Blend |
| L-cystein | |
| Salt | |
| Sodium Propionate | |
| Soybean Oil | |
| TOTAL FORMULA | |
| Flour High Protein | Blend in continuous Mixer |
| High Fructose Corn Syrup | |
| Instant Yeast | |
| Pre-Mix | Dough Temp. after Mixing 85–90° F. |
| Soybean Oil | |
| Water | |

The foregoing recipe or formulation for the pizza dough starting material used in the process is also improved from the standpoint of providing improved leavening action and moisture retention by combining preselected ingredients (listed hereinabove), e.g., (1) GDL and (2) Baking Soda, into the formulation that allow the leavening action to continue from initiation in the mixing process on through the baking process, and providing improved moisture retention and moisture absorption by utilizing further preselected ingredients in the formulation, e.g., Cellulose Gum, and enhancing the mouth feel of the finished crust as well as its flavor by using another preselected ingredient, e.g., High Fructose Corn Syrup, and utilizing still another selected ingredient in the formulation, e.g., L-cystein, to improve the machinability of the dough and make it more extendable to thereby make it easier to process the material through the automated processing apparatus, and utilizing yet another selected ingredient, e.g. Sodium Propionate, to thereby retard the formation of mold in the finished product during storage thereof.

From the foregoing disclosure and referenced test results it will now be apparent to those skilled in the art that the present invention amply fulfills the aforestated objects and provides many advantages over the prior art.

It also will be appreciated that the parbaked foodstuff of the invention may be kept refrigerated instead of being frozen prior to completing the final baking thereof. The conventional topping may be added to the top surface of the parbaked pizza prior to refrigeration and/or freezing or just prior to the step of completing the baking, depending upon the type of topping, the intended storage time and the like.

It also will be appreciated that the present invention avoids the problems associated with baking dough from the raw state and lends itself to the existing industry process (including the desire to have dough preparation done on a batch or continuous basis in a central location outside the restaurant), while avoiding the problems associated with conventional parbaked dough. Most importantly, pizza prepared according to the present invention meets the critical test in that the end result is as good as freshly prepared product (i.e., product cooked in one step from the raw dough with topping on it) and in particular instances even better.

It will be appreciated by those skilled in the art that the parbaking step reduces the time required for the final cook step, as that final cook step does not have to cook the dough from the raw state. On the other hand, the final cook step must be of sufficient length to ensure that the topping is adequately cooked, and in particular that the cheese is thoroughly melted. The latter time is typically greater than the former; thus, the final cook step time according to the present invention is determined by the type and quantity of topping more than by the need to complete baking of the parbaked dough.

Informal taste tests comparing pizzas cooked according to the present invention in a two-step operation and pizzas cooked from raw in a one-step operation have consistently found that the two-step product according to the present invention is comparable to (and in many instances better than) the conventional "cook from raw" one-step product. Because the dough cooked according to the present invention has, in all phases of the cooking procedure, been thoroughly steam hydrated, the dough is moister, less dry and more evenly cooked (i.e., the top is not overcooked relative to the bottom) relative to the comparable product, cooked in a conventional two-step operation.

To summarize, the present invention provides an improved method of parbaking a pizza foodstuff without topping on it so as to yield, after baking is completed with topping on the parbaked pizza foodstuff, a baked product similar to a product baked in one step from the raw dough with topping on it. Except for the quality and cost improvements provided by the method of the invention, this method produces products indistinguishable from the industry's standard products and can fit easily into the existing industry process.

Now that the preferred embodiments of the present invention have been shown and described in detail, various equivalent modifications and improvements thereon will become readily apparent to those skilled in the art. Accordingly, the spirit and scope of the present invention is to be construed broadly and limited only by the appended claims and applicable prior art, and not by the forgoing specification.

What is claimed is:

1. A method of preparing parbaked pizza crust which comprises the steps of providing a dough including flour, sugar, water and cellulose gum to help the dough absorb and retain the water in the dough during proofing, and parbaking, then, proofing the dough, and then separately thereafter steam hydrating the prepared and proofed dough under conditions sufficient to cause moisture absorption and a resultant increase in moisture content throughout the dough, then separately thereafter parbaking the steam hydrated dough until gelatinization of the starch is complete, and adjusting at least one parbaking condition selected from the group consisting of initial dough temperature, oven temperature, parbaking time, dough absorption and dough thickness coordinated with the moisture content condition of the dough upon completion of said steam hydration thereof for thereby delaying external browning of the dough until the starch gelatinization is complete, and discontinuing the parbaking before substantial caramelization of the sugar in the resultant crust takes place.

2. The method of claim 1 wherein said dough also includes a leavening agent.

3. The method of claim 2 wherein said pizza crust is a parbaked yeast product and said dough is a yeast dough, and including controlling said parbaking conditions for substantially reducing the moisture loss during the parbaking step to substantially less than the moisture loss which would result from ordinary baking of the same dough unhydrated at customary 400° F. oven temperatures such that the moisture content of the dough after parbaking is about 10 to 15 percent greater than the same dough parbaked under the same conditions but without the cellulose gum and without being so steam hydrated.

4. The method of claim 3 wherein said step of proofing of the dough is carried out until the dough is substantially fully risen prior to said parbaking step.

5. A method of preparing parbaked pizza crust which comprises the steps of providing a pizza dough including flour, leavening agent, sugar, water and cellulose gum to help the dough absorb and retain the water in the dough during proofing, steam hydration and parbaking, then proofing the dough, steam hydrating the dough just prior to parbaking the dough under conditions sufficient to cause moisture absorption and a resultant increase in moisture content throughout the dough to be parbaked, then separately thereafter parbaking the dough until gelatinization of the starch is complete and the dough is pasteurized, and discontinuing the parbaking while the moisture loss of the dough is substantially less than the moisture loss which would be obtained in making of a fully baked and crusted product from the same dough unhydrated and before substantial browning of the dough has taken place such that the moisture content of the dough after parbaking is about 10 to 15 percent greater than the same dough parbaked under the same conditions but without the cellulose gum and without being so steam hydrated.

6. In the method of preparing parbaked pizza crust which includes the steps of mixing conventional raw materials to form a pizza dough, proofing the dough, parbaking the dough by baking the dough until the starch is gelatinized, and discontinuing the parbaking before external browning takes place, the improvement in combination therewith of the steps of adding cellulose gum with said raw materials during the mixing step to help the dough absorb and retain water in the dough during proofing, steam hydration and parbaking, and steam hydrating the mixed dough just prior to and separately from parbaking the same and under steaming conditions sufficient to cause sufficient moisture absorption and a resultant sufficient increase in moisture content throughout the dough to be parbaked, but without causing damaging sogginess thereof, such that the moisture content of the dough after parbaking is about 10 to 15 percent greater than the same dough parbaked under the same conditions but without the cellulose gum and without being so steam hydrated.

7. The method of claim 6 wherein the steam hydrating step is performed in a steam tunnel while conveying the dough therethrough, and said parbaking step is performed in a convection air baking oven while conveying the steam hydrated dough therethrough and immediately after the hydrated dough exits the steam tunnel.

8. A method of parbaking a pizza crust foodstuff made from mixed dough and intended to be subsequently cooked with an edible topping having a given thermal insulation value and a given moisture vapor permeability on the top surface thereof, comprising the steps of:

(a) providing a raw foodstuff as a mixed dough piece containing cellulose gum and having a top surface, the foodstuff piece once parbaked being adapted for completion of the baking with a topping on the top surface thereof;

(b) surrounding all but the top surface of the raw foodstuff mixed dough piece with the side and bottom walls of a transport carrier for conveying the raw foodstuff mixed dough piece for further processing;

(c) steam hydrating the mixed dough piece while on said carrier and just prior to parbaking the same by saturated steam vapor impingement on the uncovered top surface of the foodstuff dough piece under steaming conditions sufficient to cause sufficient moisture absorption and a resultant sufficient increase in moisture content throughout the dough piece to be parbaked, but without causing damaging sogginess thereof and without setting the dough piece so as to form a hard skin on the top surface of the dough piece, such that the moisture content of the dough after parbaking is about 10 to 15 percent greater than the same dough parbaked under the same conditions but without the cellulose gum and without being so steam hydrated, (d) parbaking the steam hydrated foodstuff dough piece while on said carrier and with no covering on the top surface thereof to function as a thermal barrier and/or a moisture vapor barrier, thereby to increase the rate of heat transfer to the foodstuff top surface and the rate of moisture vapor transfer from the foodstuff top surface to ambient during parbaking relative to parbaking with a topping-substitute cover over the dough piece, and then (e) cooling the parbaked foodstuff dough piece after completing the parbaking step sufficiently to enable at least temporary storage of the parbaked foodstuff dough piece ready for receiving the topping, whereby upon completion of a subsequent second-step cooking of the foodstuff dough piece with the topping thereon, the two-step foodstuff simulates a foodstuff baked entirely in one step with the topping thereon.

9. The method of claim 8 wherein the steam hydration step (c) is performed in a steam tunnel while conveying the dough piece in transit therethrough, and the parbaking step (d) is performed in a convection air baking oven while conveying the steam hydrated dough piece in transit therethrough and immediately after exiting the steam tunnel.

10. The method of claim 9 wherein the transit time of each foodstuff dough piece through said tunnel and while being so steam hydrated in step (c) is about 30 to 45 seconds, said dough piece in step (c) being at a temperature of about 80° to 110° F. as it enters said tunnel and is raised in temperature by said steam hydration so as to exit said tunnel at a temperature of about 130° F. to about 165° F.

11. The method of claim 10 wherein the transit time of the steam hydrated dough piece through said oven in step (d) is about 90 seconds to about 130 seconds, the dough piece oven entry temperature being about 130° F. to about 165° F. and the dough piece oven exit temperature being about 180° to about 210° F.

12. The method of claim 10 wherein said dough piece is made from a pizza dough that is molded, pressed and proofed in the configuration of a pizza crust shell prior to steam hydration, and wherein the raw foodstuff dough is made from the following pizza dough ingredients prepared as raw dough starting material by the following mixing procedure:

| INGREDIENT DESCRIPTION | MIXING PROCEDURE |
|---|---|
| PREMIX 1 | |
| Ascorbic Acid | |
| Baking Soda | |
| CMC Gum | |
| Glucono Delto Lactone | Dry Blend |
| L-cystein | |
| Salt | |
| Sodium Prop | |
| Soybean Oil | |
| TOTAL FORMULA | |
| Flour High Protein | Blend in continuous Mixer |
| High Fructose Corn Syrup | |
| Instant Yeast | |
| Pre-Mix | |
| | Dough Temp. after Mixing 85–90° F. |
| Soybean Oil | |
| Water | |

13. A process for making parbaked pizza crust product having a given desired final pizza crust shape, said process comprising the steps of:

(1) Mixing a pizza dough pre-mix formulation material containing leavening agent(s) on a batch basis or continuously;

(2) Dividing the mixed material from the mixing step in a divider to produce uniform measured pizza dough pieces in a timed output on a continuous basis;

(3) Rounding the dough pieces by individually forming the dough pieces into round balls in a rounder operation;

(4) Oiling the rounded dough pieces by individually coating the rounded dough piece balls with vegetable oil in a downhill-roll oiler station that gravity feeds the rounded and oiled dough pieces into an overhead-type first proofer station;

(5) First proofing the rounded and oiled dough piece balls by allowing them to rest for a given time period while riding on a soft pliable nylon net conveyor basket in the overhead intermediate first proofer station;

(6) Panning the first proofed dough piece balls by removing them from the first proofer station output and individually loading them into an associated forming pocket of a transport pan;

(7) Performing a first pressing step to cold form the balls while loaded in the associated pan pocket into a dough first pressing of predetermined preliminary shape;

(8) Resting the first pressings by allowing them to rest unrestrained for a given time period in ambient conditions;

(9) Performing a second pressing step on the first pressings while loaded in the associated pan pocket to reform the same into a product outline shape configured for forming a final pressing having the desired final pizza crust shape;

(10) Racking the final pressings by loading the associated loaded pans into storage racks;

(11) Final proofing by moving the loaded racks into a final proofer station to allow the leavening agent(s) to continue working and such final pressings to rise under predetermined controlled conditions of time, temperature and humidity;

(12) Transferring from final proofing to steam hydration by removing the racks containing the final proofed final pressings from the proofer, unloading the pans from the racks and introducing the panned final proofed final pressings onto a steamer tunnel conveyor;

(13) Steam hydrating the panned and final proofed final pressings by conveying the same through a steaming station tunnel to thereby completely hydrate such pressings under predetermined conditions of time, temperature, pressure and steam impingement in the steaming tunnel;

(14) Parbaking the steamed and final proofed panned hydrated final pressings by conveying the same through an impingement convection oven to thereby parbake the steam hydrated final proofed final pressings sequentially in three oven zones controlled in accordance with predetermined parbake oven operating parameters to thereby form a parbaked crust product from each such pressing;

(15) Cooling the panned parbaked crust product, after removal from the output of the oven, down to about 90° F.;

(16) Applying corn meal to the bottom side of each parbaked crust product;

(17) Fast freezing stage the panned parbaked crust products, after being so cooled to 90°, and de-panned and individually placed on a blast freezer conveyor and quick frozen while so conveyed to thereby produce a completely frozen parbaked pizza crust product, but with a temperature gradient remaining between surface and interior sub-freezing temperatures of each such product;

(18) Metal detecting, inspecting and packaging the frozen product by passing the same through a metal detector inspection machine and then automatically machine packaging the same individually within a clear plastic wrap;

(19) Equilibrating the wrapped and carton packaged product by storing the same in a holding freezer where equilibration occurs by holding the product for a predetermined time at a predetermined freezer temperature; and

(20) Storing the frozen equilibrated packaged product in a warehouse freezer storage facility at about 0° F., ready for shipment to a pizza ingredients assembly area or to a distribution center for distribution to a pizza ingredients assembly facility and/or to individual pizza baking retail stores.

14. A method of making pizza comprising making a parbaked pizza crust by performing the steps of claim 13 and then filling the crust with topping and final baking the filled crust.

15. A method of preparing parbaked pizza crust food products which comprises the steps of providing a dough including flour, sugar, cellulose gum and water, pre-forming the dough into pizza crust dough pre-forms, steam hydrating the prepared dough pre-forms under conditions sufficient to cause moisture absorption and a resultant increase in moisture content throughout the dough, but without causing damaging sogginess thereof and without setting the dough pre-forms so as to form a hard skin on the outer surface of the dough of the pre-forms, then immediately thereafter separately parbaking the steam hydrated dough pre-forms until gelatinization of the starch is complete, and adjusting at least one parbaking condition selected from the group consisting of initial dough temperature, oven temperature, parbaking time, dough absorption and dough thickness coordinated with the moisture content condition of the dough upon completion of said steam hydration thereof for thereby delaying external browning of the dough until the starch gelatinization is complete, and discontinuing the parbaking before substantial caramelization of the sugar in the pizza crust food product so formed takes place.

16. The method of claim 15 wherein said dough also includes a leavening agent.

17. The method of claim 16 wherein said food product is a pizza crust made as a parbaked yeast product and said dough is a yeast dough, and said step of providing dough includes pressing and proofing operations and then performing said steam hydrating of the dough after such proofing, and including controlling said parbaking conditions for substantially reducing the moisture loss during the parbaking step to substantially less than the moisture loss which would result from ordinary baking of the same dough unhydrated at customary 400° F. oven temperatures such that the moisture content of the dough after parbaking is about 10 to 15 percent greater than the same dough parbaked under the same conditions but without the cellulose gum and without being so steam hydrated.

18. The method of claim 17 wherein said step of proofing of the dough is carried out until the dough is substantially fully risen prior to said parbaking step.

19. The method of claim 15 wherein the step of parbaking the dough until gelatinization of the starch is complete is continued until the dough is also pasteurized, and wherein the parbaking step is discontinued while the moisture loss of the dough is substantially less than the moisture loss which would be obtained in making of a fully baked and crusted product from the same dough unhydrated and before substantial browning of the dough has taken place such that the moisture content of the dough after parbaking is about 10 to 15 percent greater than the same dough parbaked under the same conditions but without the cellulose gum and without being so steam hydrated.

20. The method of claim 15 wherein the step of parbaking the dough pre-form is performed until the starch is gelatinized, and such parbaking is discontinued before external browning takes place, and wherein the steam hydrating step is performed just prior to parbaking the pre-form and under steaming conditions sufficient to cause sufficient moisture absorption and a resultant sufficient increase in moisture content throughout the dough to be parbaked, but without causing damaging sogginess thereof, such that the moisture content of the dough after parbaking is about 10–15 percent greater than the same dough parbaked under the same conditions but without being steam hydrated.

21. The method of claim 20 wherein the steam hydrating step is performed in a steam tunnel while conveying the dough pre-form therethrough, and
    said parbaking step is performed in a convection air baking oven while conveying the steam hydrated dough therethrough and immediately after the hydrated dough exits the steam tunnel.

22. The method of claim 15 wherein the parbaked food product is intended to be subsequently cooked with an edible topping having a given thermal insulation value and a given moisture vapor permeability on the top surface thereof, comprising the steps of:
    (a) pre-forming the dough into crust pre-forms in the form of a dough piece having a top surface, such that each pre-form piece once parbaked is adapted for completion of the baking with a topping on the top surface thereof;
    (b) surrounding all but the top surface of each raw foodstuff dough piece with the wall material of a transport carrier for conveying the raw foodstuff for further processing;
    (c) performing the steam hydrating of each dough piece while on the carrier just prior to parbaking the same by saturated steam vapor impingement on the uncovered top surface of the dough piece under steaming conditions sufficient to cause sufficient moisture absorption and a resultant sufficient increase in moisture content throughout the dough to be parbaked, but without causing parbaking is about 10 to 15 percent greater than the same dough parbaked under the same conditions but without the cellulose gum and without being steam hydrated,
    (d) separately thereafter oven parbaking the steam hydrated dough piece while on the carrier, and with no covering on the top surface thereof to function as a thermal barrier and/or a moisture vapor barrier, thereby to increase the rate of heat transfer to the foodstuff top surface and the rate of moisture vapor transfer from the foodstuff top surface during parbaking relative to parbaking with a topping-substitute cover over the dough, and then
    (e) cooling the resultant parbaked dough piece crust product after completing the parbaking step sufficiently to enable at least temporary storage of the parbaked crust product ready for receiving the topping, whereby upon completion of a subsequent second step cooking of the dough piece crust product with the topping thereon, the final product of such two-step cooking simulates a crust product baked entirely in one step with the topping thereon.

23. The method of claim 22 wherein the steam hydration step (c) is performed in a steam tunnel while conveying the dough piece in transit therethrough on an upper run of an endless belt conveyor,
    and the parbaking step (d) is performed in a convection air baking oven while conveying the steam hydrated dough piece in transit therethrough and immediately after exiting the steam tunnel.

24. The method of claim 22 wherein the transit time of each foodstuff dough piece through said tunnel and while being so steam hydrated in step (c) is about 30 to 45 seconds, said dough piece in step (c) being at a temperature of about 800 to 110° F. as it enters said tunnel and is raised in temperature by said steam hydration so as to exit said tunnel at a temperature of about 130° F. to about 165° F.

25. The method of claim 24 wherein the transit time of the steam hydrated dough piece through said oven is step (d) is about 90 seconds to about 130 seconds, the dough piece oven entry temperature being about 130° F. to about 165° F. and the dough piece oven exit temperature being about 180° to about 210° F.

26. The method of claim 23 wherein the steam tunnel is provided with a steam generating and distribution piping system that provides a steam jet outlet pattern within the interior chamber of the tunnel that provides relatively uniform, saturated, condensing steam and water vapor coverage of substantially the full width of the upper run of the endless belt conveyor occupied by the carriers in transit through the steam tunnel, and operating the steam generating and distribution piping system so as to maintain the interior of the steam tunnel with a condensing atmosphere for steam vapor in an environment that provides continuous heat and moisture transfer to the moving pizza dough pieces throughout the dough of each dough piece.

27. The method of claim 26 wherein some of the steam vapor also condenses on the exposed upper surface of the pizza dough pieces being carrier supported and conveyed on the conveyor upper run through the chamber of the steam tunnel, the steam condensing on the uncovered top surface of the pizza dough pieces, then by absorption passing downwardly through the dough of each dough piece to thereby provide a thorough hydration of each shell, but not to the extent of showing evidence of water or moisture damage to the pressed and proofed dough of the dough piece as it undergoes this conveyor steam bath process of steam hydration.

28. The method of claim 22 wherein steps (a) and (b) includes first rounding the dough into rounded dough balls, then first proofing the rounded dough balls at ambient temperature for about 10 minutes, then pan pressing the round dough balls in a two stage operation on the associated conveyor wherein the first pressing is performed at ambient temperature, whereas the second pressing is performed with a dwell time of about one to two seconds, then final proofing the pressed dough pieces by putting the press formed and carrier supported dough pieces in a final proofer for approximately 20 minutes under conditions of approximately 150° F. atmosphere temperature and approximately 85% humidity in the final proofer.

29. A process for making parbaked pizza crust product having a given desired final pizza crust shape, said process comprising the steps of:

(1) Mixing a pizza dough pre-mix formulation material containing leavening agent(s) on a batch basis or continuously;

(2) Dividing the mixed material from the mixing step in a divider to produce uniform measured pizza dough pieces in a timed output on a continuous basis;

(3) Rounding the dough pieces by individually forming the dough pieces into round balls in a rounder operation;

(4) Oiling the rounded dough pieces by individually coating the rounded dough piece balls with vegetable oil;

(5) First proofing the rounded and oiled dough piece balls by allowing them to rest for a given time period at ambient temperature in a first proofer station;

(6) Panning the first proofed dough piece balls by removing them from the first proofer station output and individually loading them into an associated forming pocket of a transport pan;

(7) Performing a first cold pressing step to cold form the balls while loaded in the associated pan pocket into a dough first pressing of predetermined preliminary shape;

(8) Resting the first pressing for a given time period in ambient conditions;

(9) Performing a second pressing step on the first pressing while loaded in the associated pan pocket to reform the same into a product outline shape configured for forming a first pressing having the desired final pizza crust shape;

(10) Final proofing by moving the transport pans into a final proofer station to allow the leavening agent(s) to continue working and such final pressing to rise under predetermined controlled conditions of time, temperature and humidity;

(11) Transferring from final proofing to steam hydration by removing the final proofed final pressings from the proofer and introducing the panned final proofed final pressings onto a steamer tunnel conveyor;

(12) Steam hydrating the panned and final proofed final pressings by conveying the same on the conveyor through a steaming station tunnel to thereby completely hydrate such pressings under predetermined conditions of time, temperature, pressure and steam impingement in the steaming tunnel;

(13) Parbaking the steamed and final proofed panned hydrated final pressings after performing step (12) and separate therefrom by conveying the same through an impingement convection oven to thereby parbake the steam hydrated final proofed final pressings sequentially in three oven zones controlled in accordance with predetermined parbake oven operating parameters to thereby form a pizza crust product from each such pressing;

(14) Cooling the panned parbaked crust product, after removal from the output of the oven, and

(15) Fast freezing stage the parbaked crust products, after being so cooled and then de-panned, to thereby produce a completely frozen parbaked pizza crust product.

* * * * *

UNITED STATES PATENT AND TRADEMARK OFFICE
CERTIFICATE OF CORRECTION

PATENT NO.   : 6,365,210 B1
DATED        : April 2, 2002
INVENTOR(S)  : John E. Schaible, II and Jeffrey R. Pakulski It is certified that error appears in the above-identified patent and that said Letters Patent is hereby corrected as shown below:

<u>Column 3,</u>
Line 48, after "Chesner" delete "4,030,184" and insert therein -- 4,020,184 --

<u>Column 8,</u>
Line 5, after "which" delete "favorable" and insert therein -- favorably --

<u>Column 9,</u>
Line 64, after "cooled to" delete "90°" and insert therein -- 90°F --

<u>Column 13,</u>
Line 53, after "ranges from" delete "260° to 300°" and insert therein -- 260°F to 300°F --
Lines 53 and 56, after "type" delete "and/or"

<u>Column 14,</u>
Line 6, after "between" delete "260° to 300°" and insert therein -- 260°F to 300°F --
Line 10, after "side of" delete "each" and insert therein -- the --

<u>Column 15,</u>
Line 8, after "pizza-containing" delete "and-mold" and insert therein -- and mold --
Line 53, after "approximately" delete "290°" and insert therein -- 290°F --

<u>Column 18,</u>
Line 24, after "picked up" delete "my" and insert therein -- by --

<u>Column 23,</u>
Line 61, after "downwardly as" delete "in" and insert therein -- an --

<u>Column 24,</u>
Line 21, after "shells" delete "332cm" and insert therein -- 322cm --

UNITED STATES PATENT AND TRADEMARK OFFICE
CERTIFICATE OF CORRECTION

PATENT NO.     : 6,365,210 B1
DATED          : April 2, 2002
INVENTOR(S)    : John E. Schaible, II and Jeffrey R. Pakulski It is certified that error appears in the above-identified patent and that said Letters Patent is hereby corrected as shown below:

Column 30,
Line 51, after "cooled to" delete "90°" and insert therein -- 90°F --

Column 33,
Line 10, after "180°" insert therein -- F --

Signed and Sealed this

Second Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,365,210 B1
DATED : April 2, 2002
INVENTOR(S) : John E. Schaible, II and Jeffrey R. Pakulski It is certified that error appears in the above-identified patent and that said Letters Patent is hereby corrected as shown below:

Drawings,
Figure 1, the "i" in "ingredients" was cut off for Box 22
Figure 4, a "3/8" should be removed from the top of the picture
Figure 14, delete "332cm" and insert therein -- 322cm --

Column 6,
Line 7 before "When a pizza" insert therein -- 3. --'

Column 10,
Line 20 Move "16." to the left.

Column 19,
Line 67 after "temperature" delete "I" and insert therein – in --
Line 67 after "steam" delete "tuner" and insert therein -- tunnel --

Column 20,
Line 15, after "first part" delete "of" and insert therein -- or --
Line 23, after "about" delete "165-174°C" and inert therein -- 165-170°C --

Column 21,
Line 2, after "Pat. No." delete "2,529,595" and insert therein -- 2,549,595 --
Line 14, after "three" insert therein --10 --
Column 24,
Line 64, after "specified as" delete "Shanlin" and insert therein -- Shanklin --

Column 26,
between lines 55 and 56 insert the attached text

Column 29,
Line 39, after "sodium," delete "Prop" and insert therein -- propionate --

Column 32,
Line 36 after "without causing " insert therein -- damaging sogginess thereof, such that the moisture content of the dough after --

UNITED STATES PATENT AND TRADEMARK OFFICE
CERTIFICATE OF CORRECTION

PATENT NO. : 6,365,210 B1
DATED : April 2, 2002
INVENTOR(S) : John E. Schaible, II and Jeffrey R. Pakulski It is certified that error appears in the above-identified patent and that said Letters Patent is hereby corrected as shown below:

Column 33,
Line 3, after "of about" delete "800" and insert therein -- 80º --
Line 7, after "oven" delete "is" and insert therein -- in --
Line 47, after "approximately" delete "150°F" and insert therein -- 105°F --

Signed and Sealed this

Eighth Day of June, 2004

JON W. DUDAS
*Acting Director of the United States Patent and Trademark Office*